United States Patent
Touma et al.

(10) Patent No.: US 10,086,517 B2
(45) Date of Patent: Oct. 2, 2018

(54) APPARATUS AND METHOD FOR OPERATING ROBOTS

(71) Applicant: DENSO WAVE INCORPORATED, Chita-gun, Aichi-pref. (JP)

(72) Inventors: Hirota Touma, Obu (JP); Yoshihiro Miyakoshi, Chita (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 18 days.

(21) Appl. No.: 15/074,637

(22) Filed: Mar. 18, 2016

(65) Prior Publication Data

US 2016/0368141 A1  Dec. 22, 2016

(30) Foreign Application Priority Data

Mar. 19, 2015 (JP) .................. 2015-056505
Feb. 2, 2016 (JP) .................. 2016-018005

(51) Int. Cl.
| | |
|---|---|
| *B25J 13/08* | (2006.01) |
| *B25J 9/16* | (2006.01) |
| *G06F 3/041* | (2006.01) |
| *G05B 19/409* | (2006.01) |

(52) U.S. Cl.
CPC ............. *B25J 13/08* (2013.01); *B25J 9/161* (2013.01); *B25J 13/081* (2013.01); *G05B 19/409* (2013.01); *G06F 3/041* (2013.01); *G05B 2219/35488* (2013.01); *G05B 2219/36159* (2013.01); *G05B 2219/36168* (2013.01)

(58) Field of Classification Search
CPC .................. G06F 3/041; G05B 19/409; G05B 2219/35488; G05B 2219/36159; G05B 2219/36168; B25J 9/161; B25J 13/08; B25J 13/081
USPC .................................................. 700/257, 264
See application file for complete search history.

(56) References Cited

U.S. PATENT DOCUMENTS

| | | | | |
|---|---|---|---|---|
| 6,529,785 B1* | 3/2003 | Keeley | ................... | G05B 15/02 318/443 |
| 7,221,999 B2* | 5/2007 | Sano | ........................ | B25J 13/02 180/8.1 |
| 8,423,190 B1* | 4/2013 | Yasuda | ................... | G05B 15/00 180/8.1 |
| 8,918,213 B2* | 12/2014 | Rosenstein | .............. | B25J 5/007 700/245 |
| 2012/0127102 A1* | 5/2012 | Uenohara | ............. | G06F 3/0486 345/173 |

(Continued)

FOREIGN PATENT DOCUMENTS

JP 2006-142480 A 6/2006

*Primary Examiner* — Leslie A Nicholson, III
(74) *Attorney, Agent, or Firm* — Oliff PLC

(57) ABSTRACT

A pendant is provided as a robot operating apparatus. The pendant includes an operation-input mode detecting unit that detects an operation-input mode of a touch operation inputted to a touch panel. In addition, in the pendant, an action setting unit sets an action direction and a number of actions of an inching action by a robot, based on an action mode associated with the operation-input mode with a predetermined amount of margin. Furthermore, an action command generating unit generates an action command to operate the robot such that the inching operation is performed in the action direction and by the number of actions set by the action setting unit.

21 Claims, 16 Drawing Sheets

(56) References Cited

U.S. PATENT DOCUMENTS

2015/0190925 A1* 7/2015 Hoffman .................. B25J 9/161
  700/257
2016/0229052 A1* 8/2016 Touma ..................... B25J 13/06
2016/0271792 A1* 9/2016 Yui ........................ G06F 3/0488
2016/0368137 A1* 12/2016 Yazawa ................ B25J 19/0054

* cited by examiner

FIG.5
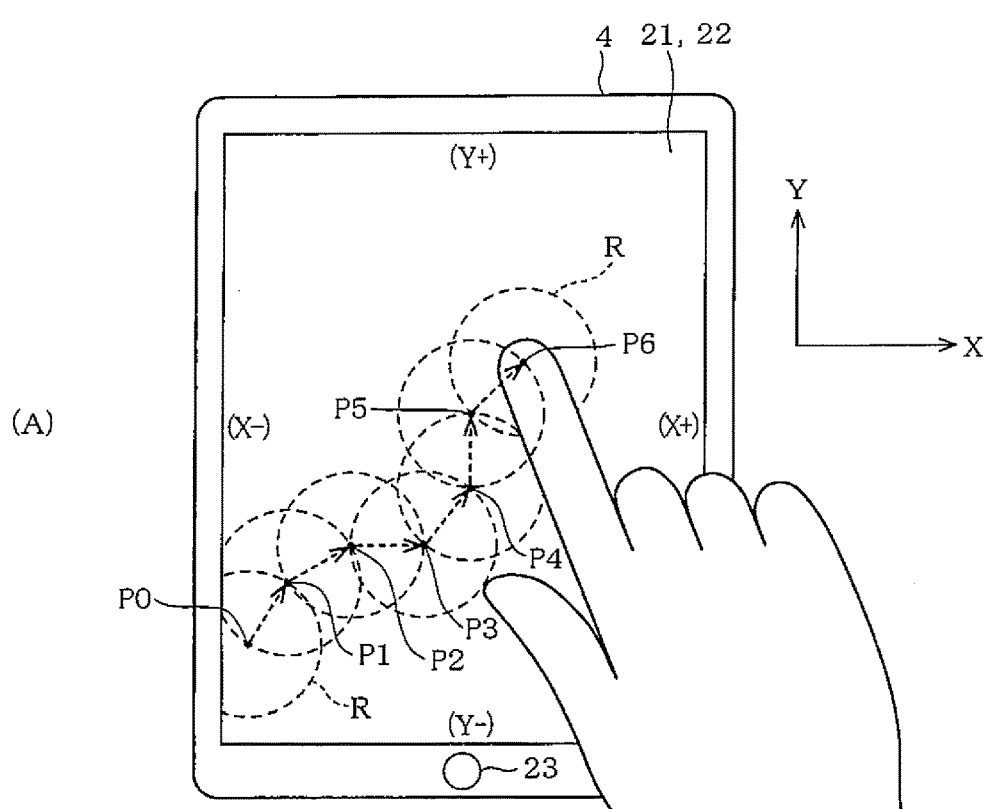
(A)
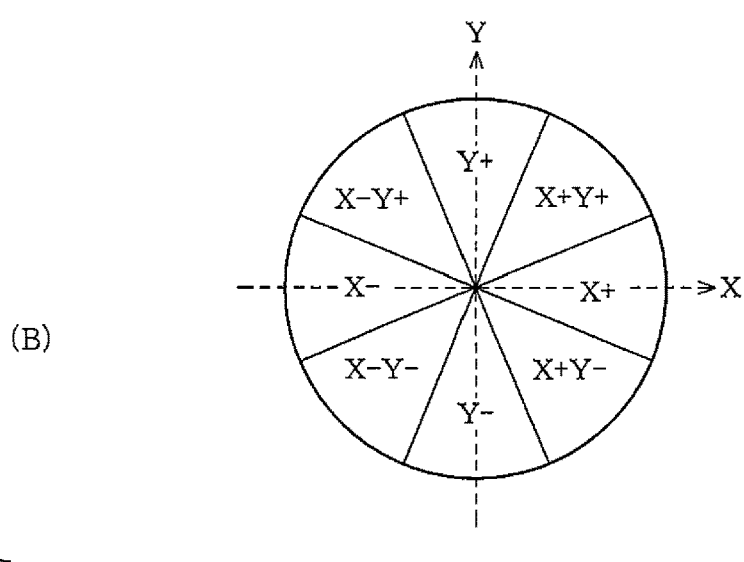
(B)

US 10,086,517 B2

APPARATUS AND METHOD FOR OPERATING ROBOTS

CROSS-REFERENCE TO RELATED APPLICATION

This application is based on and claims the benefit of priority from earlier Japanese Patent Application No. 2015-056505 filed Mar. 19, 2015 and No. 2016-018005 filed Feb. 2, 2016, the description of which is incorporated herein by reference.

BACKGROUND

Technical Field

The present invention relates to an apparatus and a method for operating a robot. In particular, the present invention relates to an apparatus and a method for operating various robots belonging to a category referred to as industrial robots.

Related Art

In a robot system for industrial use, a robot can be manually operated (referred to, hereafter, as manual operation). In cases of manual operation, in general, a user manually operates a robot using an apparatus, such as a pendant (robot operating apparatus; a so-called teaching pendant), that is connected to a controller that controls the robot. Therefore, as described in JP-A-2006-142480, for example, the teaching pendant is provided with various dedicated operating keys that are composed of mechanical switches and the like.

CITATION LIST

Patent Literature

[PTL 1] JP-A-2006-142480

SUMMARY OF INVENTION

Technical Problem

In recent years, robot operating apparatuses that include touch panels are also being used. An operation in a two-dimensional direction can be inputted by a tracing operation being performed on the touch panel (referred to, hereafter, as a touch operation). Therefore, effects, such as actualization of a more compact robot operating apparatus, a display unit having a larger screen size, and reduced cost, due to the dedicated operating keys no longer being required and the like, can be expected. Meanwhile, in cases in which the touch panel is used, it is also a fact that, unlike when physical switches are used, it is difficult to ascertaining positions through guesswork.

However, in a teaching operation for teaching a robot, the robot is required to be operated over miniscule distances, such as 0.1 mm (referred to, hereafter, as an inching operation). Consequently, when an operator looks away from the robot to operate the touch panel, the operator is required to ascertain the positions before and after the inching operation each time. Workability becomes poor. Therefore, it is desired that the operator is able to work while viewing the robot at all times during an inching operation. In other words, it is thought that, should the operator be able to perform the inching operation without looking at the touch panel, improvement in operability and shortening of teaching time can be achieved.

SUMMARY

In light of the above-described circumstances, in a robot operating apparatus that includes a touch panel and a robot operating method that uses the touch panel, it is desired that improvement in operability and shortening of teaching time can be achieved, and work efficiency is improved.

In an exemplary embodiment, the described robot operating apparatus includes: a touch panel to which a touch operation by an operator is inputted; an operation-input mode detecting unit that detects an operation-input mode of the touch operation inputted to the touch panel; an action setting unit that sets an action direction and a number of actions of an inching operation by a robot based on an action mode of the robot associated with the operation-input mode with a predetermined amount of margin; and an action command generating unit that generates an action command for operating the robot such that the inching operation is performed in the action direction and by the number of actions set by the action setting unit.

As a result, the action mode of the inching operation can be set based on the operation-input mode of the touch operation. In addition, the action direction and the number of actions can be set by a single touch operation. Therefore, operability can be improved and teaching time can be shortened, thereby improving work efficiency.

When the robot performs the inching operation, it is preferable that the operator is able to work as much as possible without looking away from the robot, as described above. However, when the touch panel is used, the operator is unable to ascertain the position through guesswork. In addition, the finger of the operator may shake. Consequently, it is difficult for the operator to accurately input physical quantities, such as a movement direction or a movement distance (distance traced by the finger) of the finger, without looking at the screen.

Therefore, when the action direction and the number of actions are uniquely associated with the inputted physical quantities, the robot may operate in an unintended direction or an unintended number of times. As a result, the work time required for performing the inching operation during the teaching operation may increase.

Here, as a result of the action mode of the inching operation by the robot being associated with the operation-input mode of the touch operation with a predetermined amount of margin, or more simply put, by associating the action mode of the robot with the movement direction and the movement distance with certain amounts of range given to the movement direction and the movement distance, the robot can perform the inching operation in a state in which finger shaking and shifts in the movement direction and the movement distance are nullified. As a result, movement in an unintended direction can be suppressed. Unnecessary increase in work time of the teaching operation as a result of excessive time being used to correct the direction and the like can be prevented. Therefore, in a configuration including a touch pane, improvement in operability and shortening of teaching time can be achieved. Work efficiency can be improved.

In addition, another exemplary embodiment relates to a robot operating method. An operation-input mode of a touch operation on a touch panel is associated with an action mode of an inching operation by a robot with a certain amount of margin. The operation-input mode of a touch operation inputted to the touch panel is detected. Based on the action mode associated with the operation-input mode, an action direction and a number of actions of the inching operation by the robot are set. An action command for operating the robot such that the inching operation is performed in the action direction and by the number of actions that are set is generated. Therefore, in a configuration including a touch panel, effects similar to those of the above-described robot operating apparatus, such as improvement in operability, shortening of teaching time, and improvement in work efficiency, can be achieved.

Other characteristic configurations and working effects of the present disclosure will become clear in the examples described with reference to the accompanying drawings.

BRIEF DESCRIPTION OF THE DRAWINGS

In the accompanying drawings:

FIG. 5, in (A) and (B) thereof, show second diagrams schematically showing correspondence between operation-input mode and action mode regarding the two-dimensional operation;

DETAILED DESCRIPTION OF THE PREFERRED EMBODIMENTS

Figure 1:
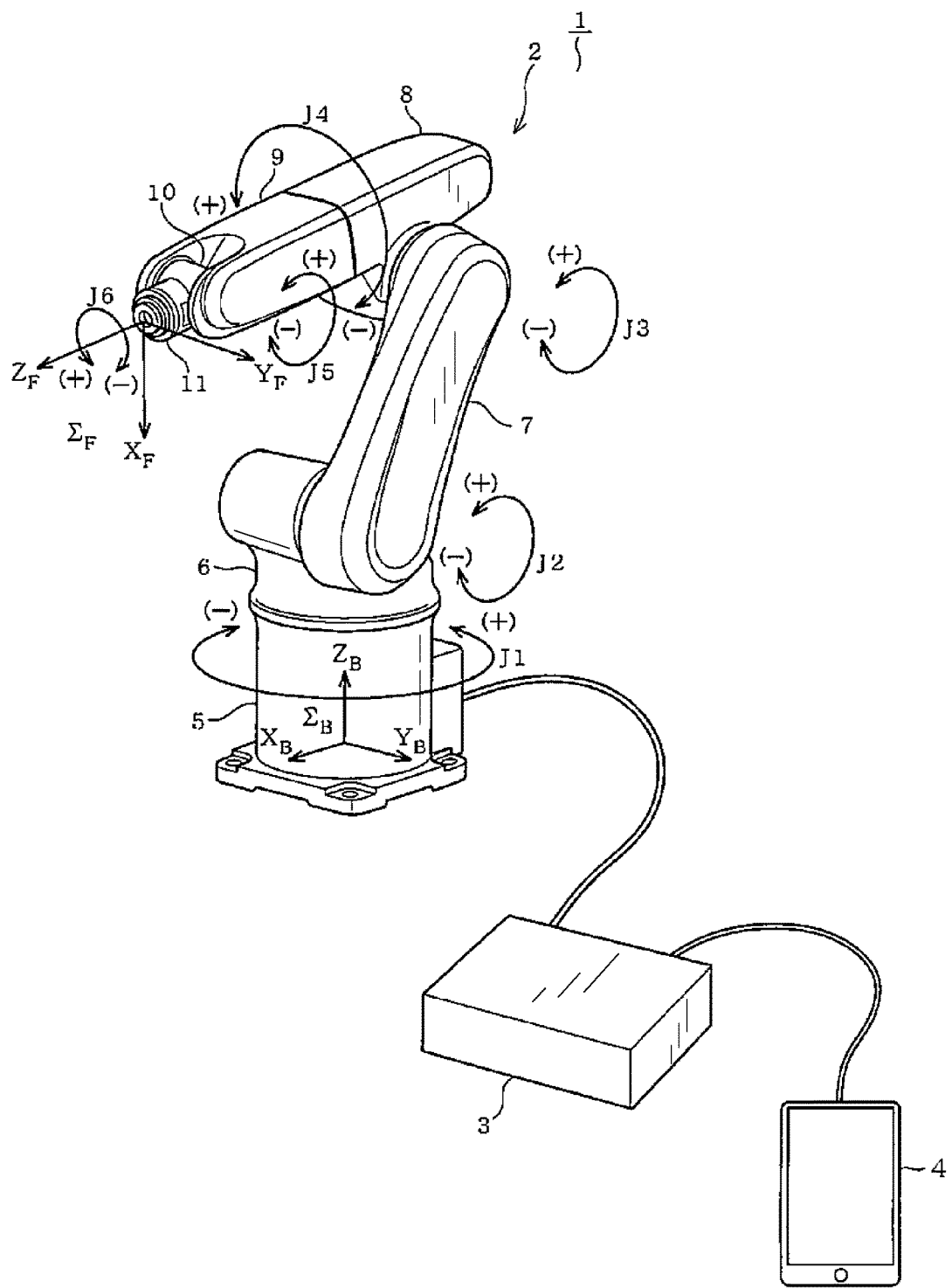
FIG. 1 is a diagram schematically showing a robot system to which a robot operating apparatus according to an embodiment is applied.

An embodiment of the present invention will hereinafter be described with reference to FIG. 1 to FIG. 8. As shown in FIG. 1, a robot system 1 includes a robot 2, a controller 3, and a pendant 4. The robot 2 is a vertical articulated-type robot. The controller 3 controls the robot 2. The pendant 4 is connected to the controller 3. The robot system 1 is used for general industrial purposes.

The robot 2 has a known configuration of a so-called six-axis vertical articulated-type robot. A shoulder 6 is connected to a base 5 such as to be capable of rotating in a horizontal direction, via a first axis (J1). The first axis has an axial center in a Z direction. A lower end portion of a lower arm 7 is connected to the shoulder 6 such as to be capable of rotating a vertical direction, via a second axis (J2). The lower arm 7 extends upwards. The second axis has an axial center in a Y direction. A first upper arm 8 is connected to a tip end portion of the lower arm 7 such as to be capable of rotating in the vertical direction, via a third axis (J3). The third axis has an axial center in the Y direction. A second upper arm 9 is connected to a tip end portion of the first upper arm 8 such as to be capable of rotating in a twisting manner, via a fourth axis (J4). The fourth axis has an axial center in an X direction. A wrist 10 is connected to a tip end portion of the second upper arm 9 such as to be capable of rotating in the vertical direction, via a fifth axis (J5). The fifth axis has an axial center in the Y direction. A flange 11 is connected to the wrist 10 such as to be capable of rotating in a twisting manner, via a sixth axis (J6). The sixth axis has an axial center in the X direction. For convenience, the sixth axis is also referred to hereafter as an end-effector axis.

The base 5, the shoulder 6, the lower arm 7, the first upper arm 8, the second upper arm 9, the wrist 10, and the flange 11 function as an arm of the robot 2. A hand (also referred to as an end effector; not shown) is attached to the flange 11 that is the tip of the arm. For example, the hand holds and transports a workpiece (not shown). Alternatively, a tool or the like used to process a workpiece is attached to the hand. Each axis (J1 to J6) of the robot 2 is provided with a corresponding motor (not shown) that serves as a drive source.

Coordinate systems that serve as reference for controlling the robot 2 are set in the robot 2, configured as described above. According to the present embodiment, a reference coordinate system ($\Sigma B$) is set as a coordinate system that corresponds to the base 5. A flange coordinate system ($\Sigma F$) is set as a coordinate system that corresponds to the end-effector axis (J6). The reference coordinate system ($\Sigma B$) does not change, regardless of the attitude of the robot 2. An XB axis, a YB axis, and a ZB axis that are orthogonal to one another are set in the reference coordinate system ($\Sigma B$). The ZB axis is perpendicular to an installation surface. In addition, the flange coordinate system ($\Sigma F$) indicates an orientation of the flange 11 in relation to a point of origin of the end-effector axis. An XF axis, a YF axis, and a ZF axis that are orthogonal to one another are set in the flange coordinate system ($\Sigma F$). Of the axes, the ZF axis is set to be coaxial with the end-effector axis. The orientation of the ZF axis indicates the orientation of the flange 11, that is, the orientation of the end effector.

The controller 3 is a control apparatus for the robot 2. The controller 3 controls the robot 2 as a result of a control means running a computer program. The control means is configured by a computer that is composed of a central processing unit (CPU), a read-only memory (ROM), a random access memory (RAM), and the like.

Specifically, the controller 3 includes a driving unit that is composed of an inverter circuit and the like. The driving unit drives each motor by, for example, feedback control, based on a rotation position of the motor detected by an encoder. The encoder is provided in correspondence to each motor.

Figure 2:
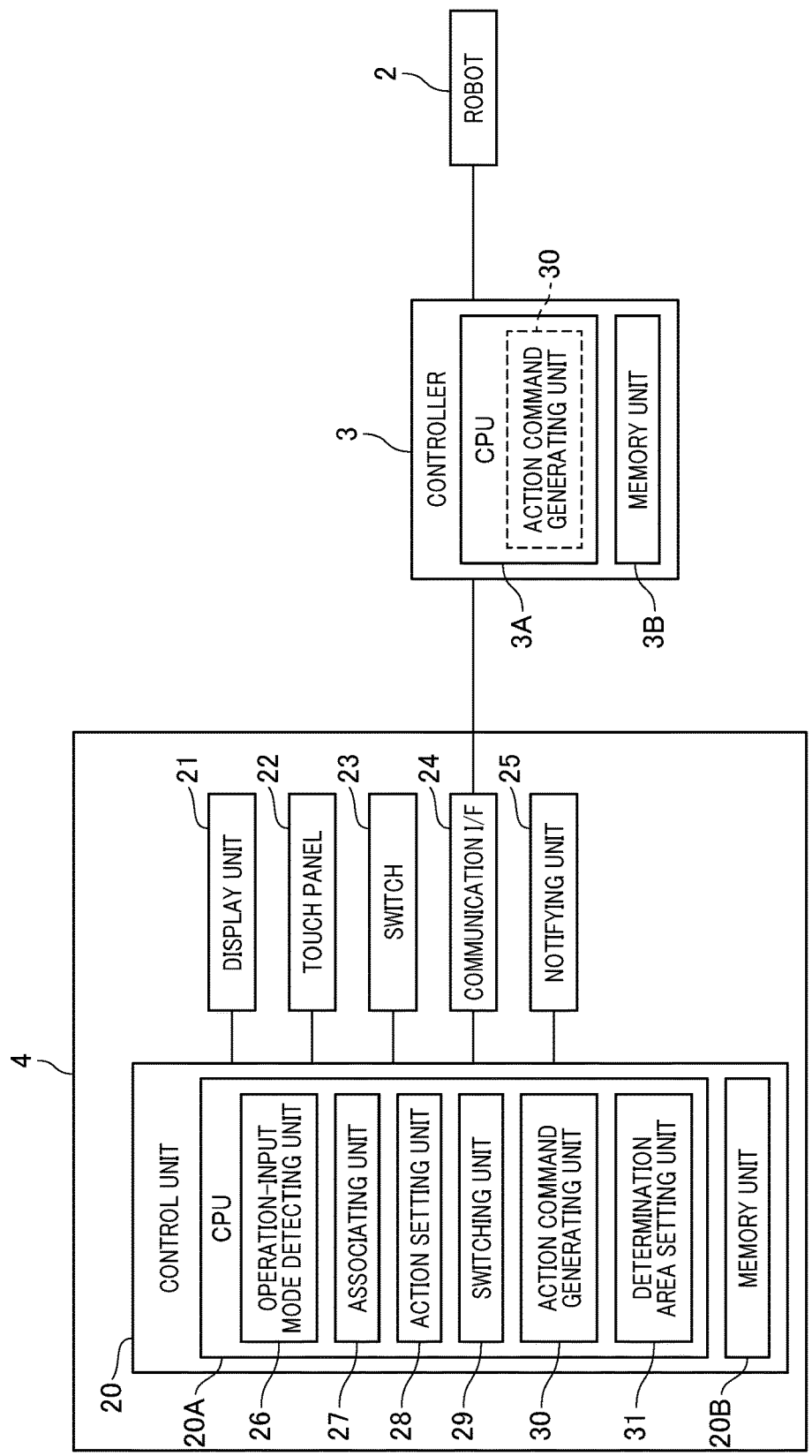
FIG. 2 is a diagram schematically showing an electrical configuration of the robot operating apparatus.

The pendant 4 is connected to the controller 3 by a connection cable. The pendant 4 performs wired or wireless data communication with the controller 3, via a communication interface (see FIG. 2; communication interface [I/F] 24). Therefore, various operations inputted to the pendant 4 by a user are transmitted to the controller 3 as operating information. The pendant 4 is formed such as to have a casing that is about a size enabling a user to carry the pendant 4 or to operate the pendant 4 while holding the pendant 4 in a hand. As shown in FIG. 2, the pendant 4 includes a control unit 20, a display unit 21, a touch panel 22, a switch 23, the communication I/F 24, a notifying unit 25, and the like. The control unit 20 is configured by a microcomputer that has a CPU, a ROM, a RAM, and the like (not shown). The control unit 20 controls the overall pendant 4. For example, the control unit 20 runs a computer program stored in a storage unit 20A (corresponding to a non-transitory computer-readable medium). The control unit 20 thereby starts the robot 2, controls the attitude of the robot 2, sets various parameters, and the like.

The display unit 21 is composed of, for example, a liquid crystal display. The touch panel 22 is provided in correspondence with a display surface of the display unit 21. The switch 23 is a mechanical operating switch used to operate the pendant 4, such as a power switch. A configuration in which a button or the like is displayed in the display unit 21 in place of the switch 23 is also possible. The user (operator) can manually operate the robot 2 by inputting various operations through the touch panel 22 and the switch 23.

For example, the user can control the attitude of the robot 2 using the pendant 4. In addition, by manually operating the robot 2, the user can perform various teaching operations, such as setting a target position, setting a movement trajectory, and setting the orientation of the end effector. At this time, for example, a menu screen, a setting input screen, and a status display screen are displayed in the display unit 21 as required. Hereafter, an operation inputted to the touch panel 22 by the user is referred to as a touch operation. The notifying unit 25 is composed of a speaker, a vibrator, or the like. The notifying unit 25 notifies the user of a response to an operation performed by the user and the like through sound, vibrations, or the like.

In addition, the pendant 4 includes an operation-input mode detecting unit 26, an associating unit 27, an action setting unit 28, a switching unit 29, an action command generating unit 30, and a determination area setting unit 31. That is, according to the present embodiment, the pendant 4 alone configures a robot operating apparatus. The action command generating unit 30 may be provided on the controller 3 side. The operation-input mode detecting unit 26 detects operation-input mode when the user inputs a touch operation. Specifically, the operation-input mode detecting unit 26 detects, as the operation-input mode, an operating position at which the touch operation is inputted (coordinates on a panel surface of the touch panel 22), an operating amount (distance over which tracing is performed on the panel surface), an operating direction (direction in which the tracing is performed on the panel surface), the number of fingers touching the touch panel 22, and the like. The operation-input mode detecting unit 26 detects the operation-input mode in real time.

An operation on the touch panel 22 may be performed, not only by a finger, but also using a stylus pen or the like. However, for simplicity of description, the expression "moving a finger" hereafter also includes cases in which a tool, such as a stylus pen, is used. The associating unit 27 associates the operation-input mode of a touch operation on the touch panel 22 with an action mode of an inching operation of the robot 2, with a predetermined amount of margin. Specifically, as described hereafter, the associating unit 27 associates the operating direction of a touch operation with an action direction of an inching operation, with a certain amount of range (margin). In addition, the associating unit 27 associates the operating amount with a number of actions of an inching operation, with a certain amount of range (margin).

The action setting unit 28, described in detail hereafter, sets the action direction and the number of actions of the inching operation of the robot 2, based on the operation-input mode of the operation that is actually inputted and the action mode of the robot 2 associated with the operation-input mode. The switching unit 29, described in detail hereafter, changes the correspondence between the operation-input mode and the action mode associated by the associating unit 27.

Simply put, the switching unit 29 switches among the actions taken by the robot 2 when a touch operation is performed.

The action command generating unit 30 generates various action commands for operating the robot 2. In addition, according to the present embodiment, the action command generating unit 30 generates an action command for operating the robot 2 such that the robot 2 performs an inching operation in the action direction and by the number of actions set by the action setting unit 28. The determination area setting unit 31, described in detail hereafter, sets a determination area (see (A) and (B) of FIG. 5) that serves as reference for determining the number of actions. Next, the working of the above-described configuration will be described.

First, details of the inching operation will be described. When fine adjustment is performed during a teaching operation, the user may move the position of the robot 2 to a location that facilitates confirmation, while adjusting the position of the robot 2 within a plane (referred to, hereafter, as an action plane, for convenience) enabling the robot 2 to be operated in two predetermined axial directions (such as the XF axis and the YF axis of the flange coordinate system). For example, when teaching is performed for an operation in which the end effector of the robot 2 grasps a workpiece, the user sets an XY plane that includes the XF axis and the YF axis of the flange 11 as the action plane, and positions the robot 2 within the XY plane. Subsequently, the user performs the teaching operation by moving the robot 2 in the ZF axis direction and determining the height of the robot 2.

At this time, when operating the robot 2 on the XY plane, the user confirms that the end effector is positioned above the workpiece from a position at which the eye level of the user is above the end effector and the workpiece. In addition, when operating the robot 2 on the Z axis, the user confirms that the end effector is positioned at a height allowing the end effector to grasp the workpiece, from a position at which the eye level of the user is at substantially the same height as the end effector and the workpiece. Therefore, it is thought that, during fine adjustment, all that is required is that a one-dimensional operation and a two-dimensional operation on the XY plane are able to be performed. The one-dimensional operation is an operation in the X direction, the Y direction, or the Z direction on the XY plane. The two-dimensional operation is, for example, an operation in the XY direction on the XY plane. As described hereafter, the pendant 4 is capable of performing the one-dimensional operation and the two-dimensional operational. Specific examples of the one-dimensional operation and the two dimensional operations are separately described below.

<<First Example of the One-Dimensional Operation>>

Figure 3:
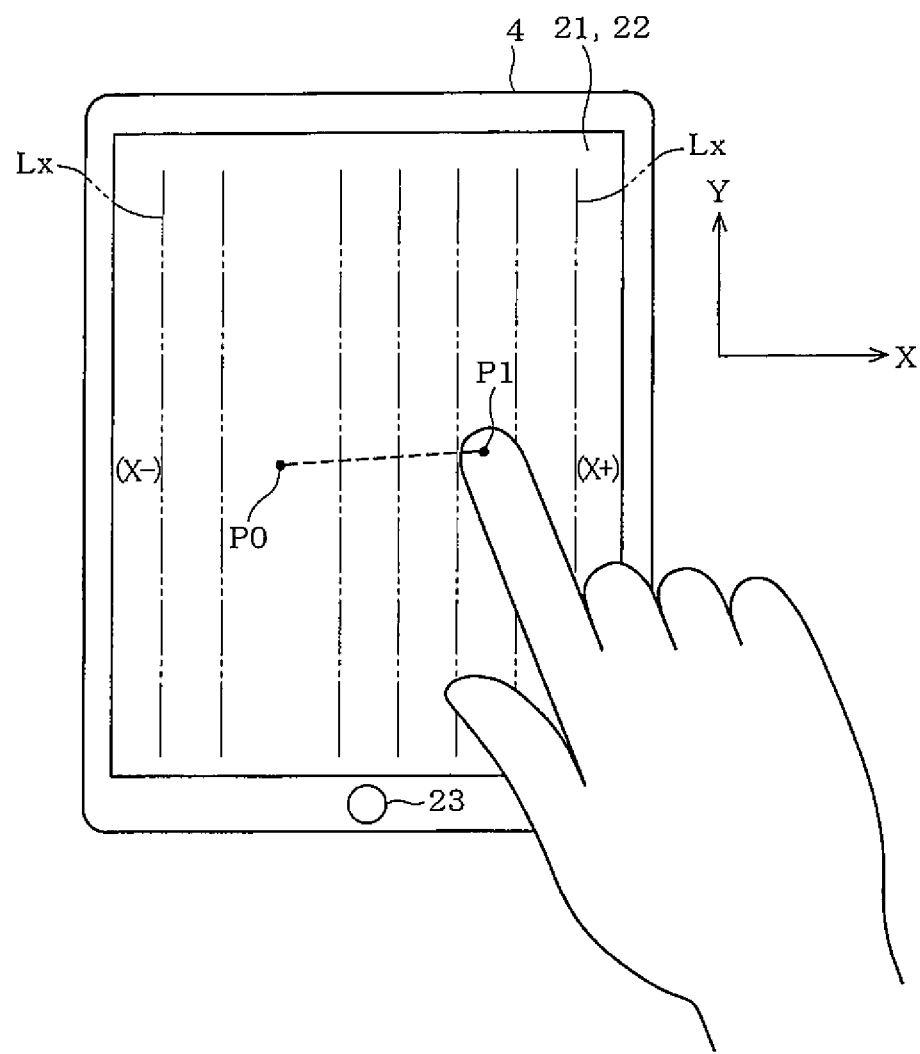
FIG. 3 is a first diagram schematically showing correspondence between operation-input mode and action mode regarding a one-dimensional operation.

As shown in FIG. 3, in the present example, a coordinate system is set on the panel surface of the touch panel 22 in the pendant 4. In the coordinate system, a left/right direction of the screen (left/right direction in FIG. 3) corresponds to the X axis and an up/down direction of the screen (up-down direction in FIG. 3) corresponds to the Y axis. In the present example, the X axis is associated with the XF axis of the flange coordinate system (ΣF). A positive side of the X axis (right side in FIG. 3; also referred to, hereafter as an X+ side) corresponds to a positive action direction on the XF axis. A negative side of the X axis (left side in FIG. 3; also referred to, hereafter, as an X− side) corresponds to a negative action direction on the XF axis.

The pendant 4 associates the operating direction of the touch operation and the action direction on the XF axis in a one-dimensional manner. Specifically, when the user moves a finger from a start position (P0) at which the touch operation is started to a position (P1) on the X+ side, the operating direction of the touch operation is the X+ side. The start position (P0) indicates the position first touched by the finger of the user in a single touch operation from when the finger touches the panel surface until the finger is removed. In this case, the pendant 4 determines that the user has inputted an operation for an inching operation in the positive action direction on the XF axis, and sets the action direction to be the X+ side.

In this way, the pendant 4 sets the action mode (the action direction, in this case) of the inching operation of the robot 2 based on the operation-input mode (the operating direction, in this case) of the touch operation. Here, the inching operation is performed after the robot 2 is moved to the general vicinity of a target position. In addition, the inching operation moves the robot 2 by a miniscule distance, as described above. Therefore, ordinarily, the user performs final positioning by repeatedly performing the inching operation from the position in the general vicinity of the target position. That is, during the teaching operation, the inching operation is repeatedly performed to some extent.

In this case, in a configuration in which the inching operation is performed using a mechanical switch as in the past, the mechanical switch is repeatedly pressed. Here, it is though that teaching time can be shortened if the number of repeat presses can be reduced. Therefore, the pendant 4 takes advantage of the characteristic of the touch panel in that a two-dimensional operation on the XY plane can be inputted as described above, and associates the number of actions of the inching operation, in addition to the action direction, with the operation-input mode of the touch operation.

Specifically, the pendant 4 sets a plurality of boundary lines (Lx) that are spaced apart and provided in the X axis direction associated with the action direction, with the start position (P0) as a starting point. The boundary line (Lx) indicates a boundary position that serves as a boundary for changing the number of actions of the inching operation. The boundary lines (Lx) are set such as to run along the up/down direction of the screen at a right angle to the direction associated with the action direction (the left/right direction in FIG. 3). In addition, the pendant 4 presents the boundary lines (Lx) such as to be visible to the user by displaying the boundary lines (Lx) in the display unit 21. The spacing between the boundary lines (Lx) can be arbitrarily set, as long as the boundary lines (Lx) are set such that the finger of the user does not touch two boundary lines (Lx) at the same time.

Then, the pendant 4 sets the number of actions of the inching operation based on the operating amount of the touch operation, or more specifically, the number of boundary lines (Lx) crossed from the start position (P0). For example, in FIG. 3, the operating position (P1) is at a position that is three boundary lines away from the start position (P0). In this case, the number of actions of the inching operation is set to three. As a result, the inching operation can be performed a plurality of number of times by a single touch operation. Work efficiency can be improved.

The detection of the operating position is performed in real time. Therefore, as the actual operation of the robot 2, the first inching operation is performed at the timing at which the first boundary line (Lx) is crossed. The second inching operation is performed at the timing at which the second boundary line (Lx) is crossed. The third inching operation is performed at the timing at which the third boundary line (Lx) is crossed. At this time, the pendant 4 sets the boundary lines (Lx) such as to be separated from each other and does not set a boundary line (Lx) at the start position (P0). A disadvantage of the touch operation on the touch panel 22 is said to be that accurate input of a specific length is difficult due to the possibility of the finger shaking.

Therefore, as a result of the boundary lines (Lx) being set such as to be spaced apart, or in other words, the number of actions being changed in steps, the pendant 4 can nullify finger shaking and the like. In addition, as a result of the boundary line (Lx) not being set at the start position (P0), the pendant 4 prevents operation in an unintended action direction caused by the finger shaking when the touch operation is started. In this way, the pendant 4 sets, in steps, the action mode (the number of actions, in this case) of the inching operation of the robot 2 based on the operation-input mode (the operating amount, in this case) of the touch operation.

<<First Example of the Two-Dimensional Operation>>>

Figure 4:
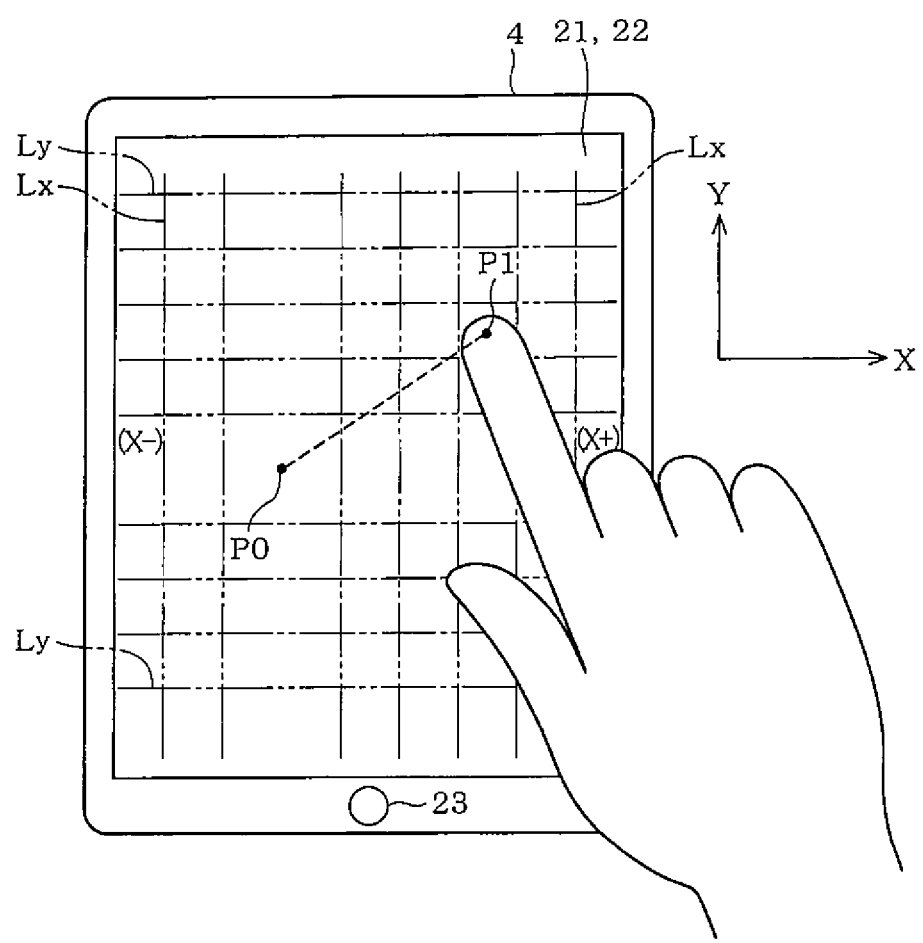
FIG. 4 is a first diagram schematically showing correspondence between operation-input mode and action mode regarding a two-dimensional operation.

As shown in FIG. 4, in the present example, a coordinate system is set on the panel surface of the touch panel 22 in the pendant 4. In the coordinate system, the left/right direction of the screen (left/right direction in FIG. 4) corresponds to the X axis and the up/down direction of the screen (up-down direction in FIG. 4) corresponds to the Y axis. In the present example, the X axis is associated with the XF axis of the flange coordinate system (ΣF). The positive side of the X axis (right side in FIG. 4; also referred to, hereafter as the X+ side) corresponds to the positive action direction on the XF axis. The negative side of the X axis (left side in FIG. 4; also referred to, hereafter, as the X− side) corresponds to the negative action direction on the XF axis. In addition, the Y axis is associated with the YF axis of the flange coordinate system (ΣF). A positive side of the Y axis (upper side in FIG. 4; also referred to, hereafter as the Y+ side) corresponds to a positive action direction on the YF axis. A negative side of the Y axis (lower side in FIG. 4; also referred to, hereafter, as the Y− side) corresponds to a negative action direction on the YF axis.

The pendant 4 associates the operating direction of the touch operation with the action direction on the XF axis and the action direction on the YF axis in a two-dimensional manner. Specifically, as shown in FIG. 4, when the user moves a finger from the start position (P0) at which the touch operation is started to a position (P1) on the X+ side and the Y+ side, the operating direction of the touch operation is the X+ side and the Y+ side. That is, when the operating position changes as in FIG. 4, the pendant 4 determines that the user has inputted an operation for an inching operation in the positive action direction on the XF axis and the positive action direction on the YF axis.

The pendant 4 sets the action direction to be a two-dimensional direction on the X+ side and the Y+ side.

At this time, the pendant 4 sets a plurality of boundary lines (Lx and Ly) that are spaced apart and provided in both the X axis direction and the Y axis direction associated with the action direction, with the start position (P0) as the starting point. The boundary line (Lx and Ly) indicates a boundary position that serves as a boundary for changing the number of actions of the inching operation. The boundary lines (Lx and Ly) are set such as to run along the up/down direction and the left/right direction of the screen at a right angle to the direction associated with the action direction (the left/right direction and the up/down direction in FIG. 4). That is, the boundary lines (Lx) are set to be perpendicular to the X axis and the boundary lines (Ly) are set to be perpendicular to the Y axis. In addition, the pendant 4 presents the boundary lines (Lx and Ly) such as to be visible to the user by displaying the boundary lines (Lx and Ly) in the display unit 21. The spacing between the boundary lines (Lx and Ly) can be arbitrarily set, as long as the boundary lines (Lx and Ly) are set such that the finger of the user does not touch two boundary lines (Lx or Ly) at the same time.

The pendant 4 decomposes the number of actions of the inching operation, that is, the operating amount of the touch operation into components for each action direction. The pendant 4 then sets, in steps, the number of actions based on the components for each action direction. Specifically, in FIG. 4, the operating position (P1) is a position that is three boundary lines (Lx) away from the start position (P0) in the X axis direction, and two boundary lines (Ly) away in the Y axis direction. In this case, the component for the X axis direction corresponds to three boundary lines (Lx), that is, three in terms of the number of actions. The component for the Y axis direction corresponds to two boundary lines (Ly), that is, two in terms of the number of actions. In this case, the pendant 4 sets the number of actions such that the robot 2 performs the inching operation three times in the X+ direction and twice in the Y+ direction.

The detection of the operating position is performed in real time. Therefore, in the example in FIG. 4, as the actual operation of the robot 2, the first inching operation in the X+ direction is performed at the timing at which the first boundary line (Lx) in the X+ direction is crossed. The first inching operation in the Y+ direction is performed at the timing at which the first boundary line (Ly) in the Y+ direction is crossed. The second inching operation in the X+ direction is performed at the timing at which the second boundary line (Lx) in the X+ direction is crossed. The second inching operation in the Y+ direction is performed at the timing at which the second boundary line (Ly) in the Y+ direction is crossed. The third inching operation in the X+ direction is performed at the timing at which the third boundary line (Lx) in the X+ direction is crossed. In this way, the pendant 4 sets the action mode (the two-dimensional action direction and the number of actions) of the inching operation of the robot 2 based on the operation-input mode (operating direction and operating amount) of the touch operation.

Even when an operation in a two-dimensional direction can be inputted as in the present example, for example, the robot 2 does not operate in the Y axis direction unless the boundary line (Ly) in the Y direction is crossed. Therefore, the configuration of the present example can also be used when the robot 2 is to be operated in only a one-dimensional direction. In addition, as a result of the boundary lines (Lx and Ly) being set such as to be spaced apart, even should the finger move such as to shift at a slight angle when the robot 2 is to be operated in only a one-dimensional direction, the amount of shift can be nullified. In addition, as a result of the boundary lines (Lx and Ly) being set such as to be spaced apart, finger shaking and the like can be nullified. As a result of the boundary line (Lx and Ly) not being set at the start position (P0), operation of the robot 2 in an unintended direction resulting from the finger shaking when the touch operation is started can be prevented.

<<Second Example of the Two-Dimensional Operation>>

In the present example, as shown in (A) of FIG. 5, a coordinate system is set on the panel surface of the touch panel 22 in the pendant 4. In the coordinate system, the left/right direction of the screen (left/right direction in (A) of FIG. 5) corresponds to the X axis and the up/down direction of the screen (up-down direction in (A) of FIG. 5) corresponds to the Y axis. In the present example, the X axis is associated with the XF axis of the flange coordinate system (ΣF). The positive side of the X axis (right side in (A) of FIG. 5; also referred to, hereafter as the X+ side) corresponds to the positive action direction on the XF axis. The negative side of the X axis (left side in (A) of FIG. 5; also referred to, hereafter, as the X− side) corresponds to the negative action direction on the XF axis. In addition, the Y axis is associated with the YF axis of the flange coordinate system (ΣF). The positive side of the Y axis (upper side in (A) of FIG. 5; also referred to, hereafter as the Y+ side) corresponds to the positive action direction on the YF axis. The negative side of the Y axis (lower side in (A) of FIG. 5; also referred to, hereafter, as the Y− side) corresponds to the negative action direction on the YF axis.

In addition, the pendant 4 sets a determination area (R) on the panel surface of the touch panel 22. The size of the determination area (R) is set in advance. The determination area (R) is set to have a circular ring shape with the start position (P0) set as the center at the start of a touch operation. In addition, when the operating position reaches the determination area (R) as a result of the user moving the finger, as described hereafter, the determination area (R) is newly set with an arrival position (P1 to P6 in (A) of FIG. 5) as the center.

As shown in (B) of FIG. 5, the determination area (R) is divided into eight sections in the circumferential direction. The X+ direction, the X− direction, the Y+ direction, the Y− direction, the X+Y+ direction, the X+Y− direction, the X−Y+ direction, and the X−Y− direction are respectively associated with the sections. The pendant 4 detects the direction towards the arrival position (any one of P1 to P6 in (A) of FIG. 5) that is the position at which the finger reaches the determination area (R) from the center of the determination area (R) (any one of P 0 to P5 in (A) of FIG. 5) as the operating direction. The pendant 4 then sets the detected operating direction as the action direction of the inching operation.

More specifically, when the touch operation is started, the pendant 4 detects the direction from the start position (P0) towards the first arrival position (P1) as the operating direction, and sets the operating direction as the action direction of the inching operation. In addition, the pendant 4 newly sets the determination area (R) with the first arrival position (P1) as the center. Then, when the user moves the finger and reaches the next arrival position (P2), the pendant 4 detects the direction from the center of the determination area (R) (arrival point [P1], in this case) towards the arrival point (P2) as the operating direction, and sets the operating direction as the action direction of the inching operation. In addition, the pendant 4 newly sets the determination area (R) with the arrival position (P2) as the center.

In this way, at the start of the touch operation, the pendant 4 sets the determination area (R) with the start position as the center. Each time the operating position reaches the edge of the determination area, the pendant 4 sets the new determination area (R) with the arrival position as the center. In addition, the pendant 4 sets the operating direction of each determination area (R) as the action direction of the inching operation. Here, the size of the determination area (R) can be arbitrarily set. As a result, the action direction of the inching operation can be set based on the operating direction. In addition, the number of actions of the inching operation can be set by the number of times the determination area (R) is reached.

Even when an operation in a two-dimensional direction can be inputted as in the present example, for example, the robot 2 does not operate in the X axis direction unless the section corresponding to Y+ is crossed. Therefore, the configuration of the present example can also be used when the robot 2 is to be operated in only a one-dimensional direction. In addition, each action direction is set with a certain amount of range. Therefore, even should the finger move such as to shift at a slight angle when the robot 2 is to be operated in only a one-dimensional direction, the amount of shift can be nullified.

<<Second Example of the One-Dimensional Operation>>

Figure 6:
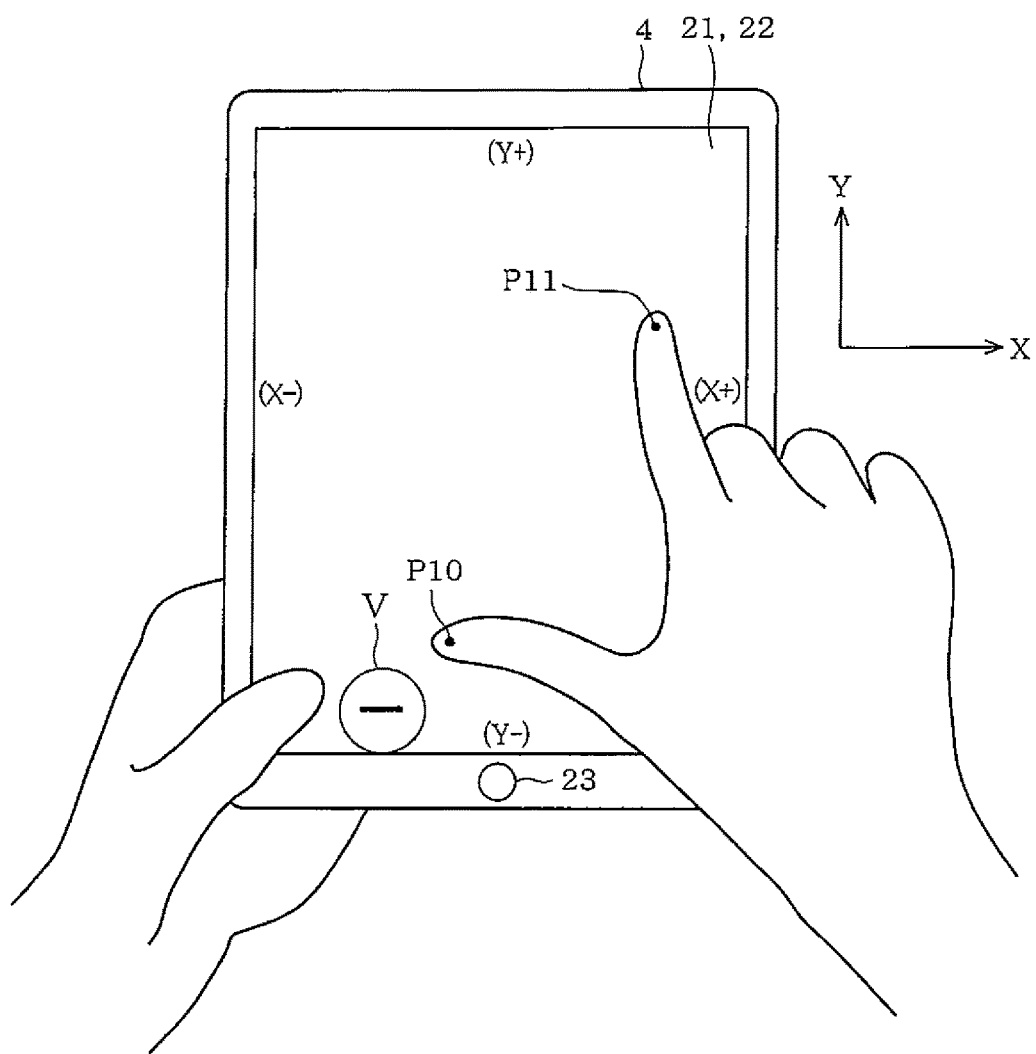
FIG. 6 is a second diagram schematically showing correspondence between operation-input mode and action mode regarding the one-dimensional operation.

In the present example, an axis on which the robot 2 is to be operated in an inching operation is set in advance. In addition, as shown in FIG. 6, a selection button V is set on the panel surface of the touch panel 22 in a position that is reachable by the user shifting the thumb, for example, of the hand (left hand in FIG. 6) that is gripping the pendant 4. The selection button V is used to select the action direction of the inching operation.

In this case, as the operating mode, the pendant 4 detects the number of touch operations, the number of input positions of a touch operation (the number of fingers touching the touch panel 22), and whether or not the selection button V is touched. The pendant 4 sets the product of "the number of touch operations" multiplied by "the number of input positions" as the number of actions of the inching operation. Specifically, in a case in which there are two input positions (P10 and P11) as in FIG. 6, when a single touch operation is inputted, the pendant 4 sets the number of actions of the inching operation to be 1×2=2. In addition, when the touch operation is repeatedly performed N times, the pendant 4 sets the number of actions of the inching operation to be N×2=2N.

As a result, the inching operation can be performed a plurality of times by a single touch operation. Work time of the teaching operation in which the inching operation is repeated as described above can be shortened. In addition, the action direction can be selected by the selection button V being touched. In FIG. 6, the robot 2 operates in the positive direction when the selection button V is not being touched. The robot 2 operates in the negative direction when the selection button V is being touched. In this case, as a result of the selection button V being set in a position reachable by moving only a finger on the hand gripping the pendant 4, the user can easily select the operating direction.

In this way, the pendant 4 detects the operation-input mode of the touch operation (the number of operating positions at which a touch operation is inputted, the number of times the touch operation is inputted, and whether or not the selection button C is touched), and sets the number of actions of the inching operation to a number proportional to the number of operating positions. In addition, the pendant 4 sets the action direction of the inching direction based on whether or not the selection button V is being touched. As a result, the number of actions of the inching operation can be easily set. The action direction of the inching operation can also be easily set.

In this case, the determination area (R) is newly set with the arrival position as the center, each time the operating position reaches the determination area (R). Therefore, even when the robot 2 overshoots the target position, the user can promptly make the robot 2 perform the inching operation in the reverse direction.

<<Changing Correspondence Between Operation-Input Mode and Action Mode>>

Next, a method for changing the correspondence between the operation-input mode of the touch operation and the action mode of the robot 2 will be described with reference to (A) and (B) of FIG. 7 to (A) and (B) of FIG. 9. The correspondence that is changed, described below, is an example. The present invention is not limited thereto.

Figure 7:
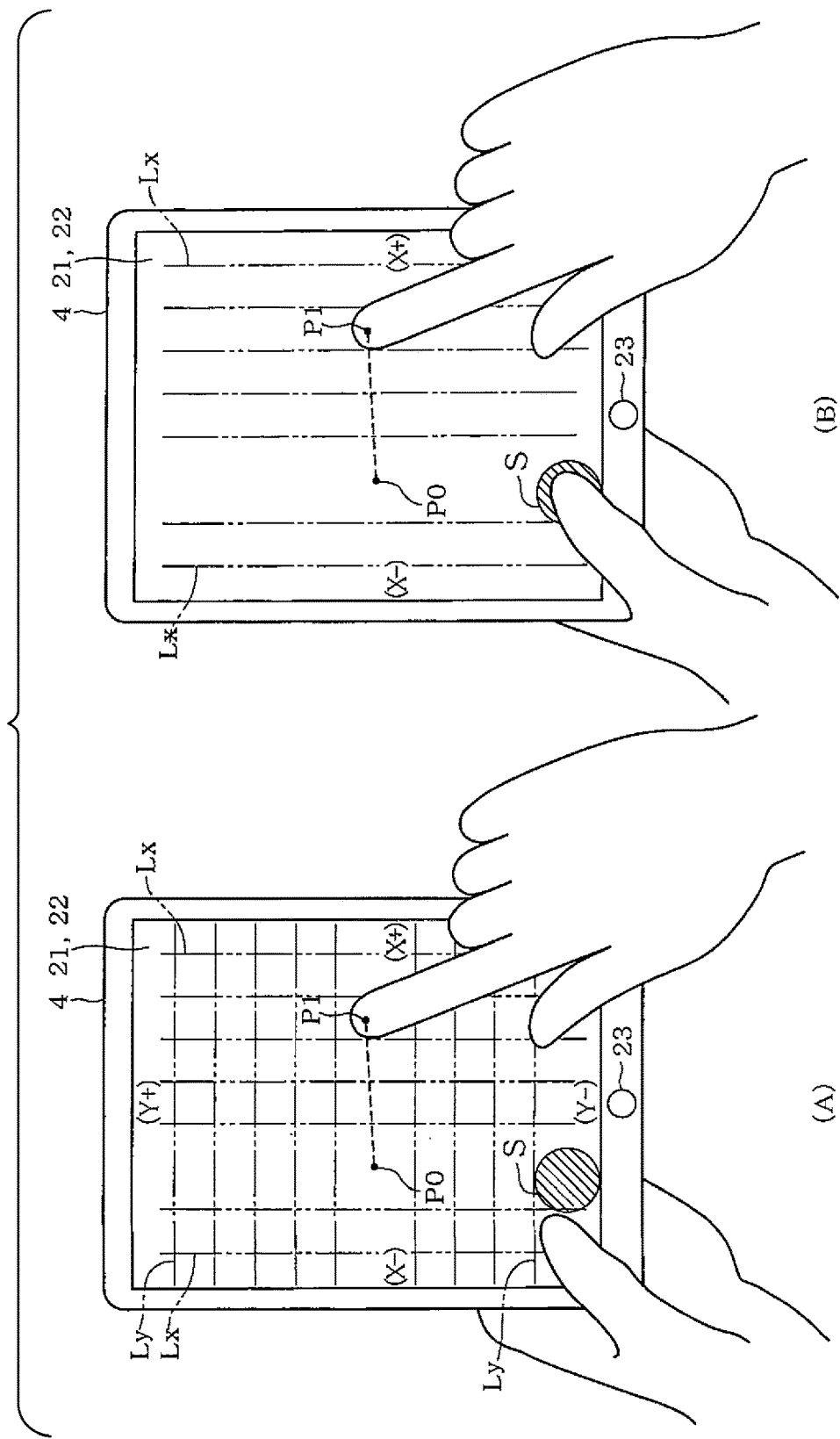
FIG. 7, in (A) and (B) thereof, show first diagrams schematically showing a method for changing the correspondence between the operation-input mode of a touch operation and the action mode of a robot.

For example, in the example in (A) of FIG. 7 and (B) of FIG. 7, the pendant 4 sets a switch button S in the touch panel 22. The switch button S is used to change the correspondence between the operation-input mode of the touch operation and the action mode of the robot 2. The switch button S is set in a position that is reachable by the user shifting the thumb, for example, of the hand (left hand in (A) of FIG. 7 and (B) of FIG. 7) that is gripping the pendant 4. In FIG. 7, switching is performed between the correspondence in the first example of the two-dimensional operation and the correspondence in the first example of the one-dimensional operation, depending on whether or not the switch button S is touched.

In the case of the first example of the two-dimensional operation, described above, the robot 2 can be made to perform the inching operation in a two-dimensional direction. Therefore, this example is suitable for an inching operation that is large to a certain extent (the number of actions is large). Meanwhile, in the case of the first example of the one-dimensional operation, because the action direction is one-dimensional, the robot 2 can be made to perform the inching operation in a desired action direction without the user being very conscious of finger shaking and the like during the touch operation. Therefore, this example is suitable for fine adjustments. Thus, when switching can be performed between the correspondence in the first example of the two-dimensional operation and the correspondence in the first example of the one-dimensional operation, that is, when the action mode of the inching operation associated with the operation-input mode of the touch operation can be changed, it is thought that work efficiency can be improved.

Here, the pendant 4 switches between the correspondence corresponding to the first example of the two-dimensional operation shown in (A) of FIG. 7 and the correspondence corresponding to the first example of the one-dimensional operation shown in (B) of FIG. 7, based on whether or not the user touches the switch button S. As a result, the action mode can be easily changed depending on when a large inching operation is to be performed and when fine adjustment is to be made. Work efficiency is improved.

Figure 8:
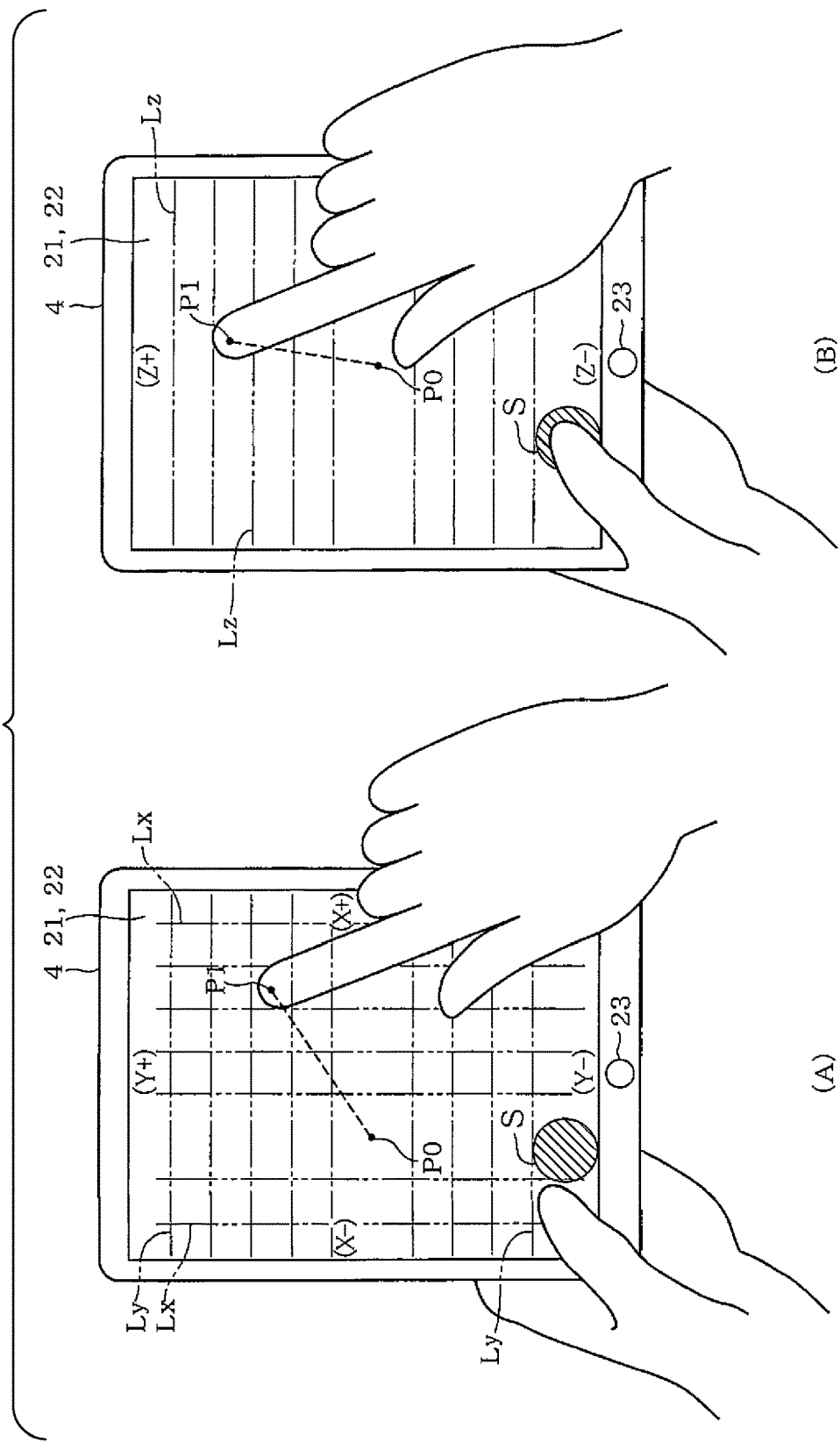
FIG. 8, in (A) and (B) thereof, show are second diagrams schematically showing a method for changing the correspondence between the operation-input mode of a touch operation and the action mode of a robot.

In addition, in the example in (A) and (B) of FIG. 8, the pendant 4 changes the axis on which the robot 2 is to be operated as the action aspect of the inching operation, by the switch button S. As described above, in the teaching operation, the robot 2 may be positioned within an action plane, and adjustment in the height direction may be separately made. Therefore, when switching between the inching operation on the action plane and the inching operation in the height direction can be smoothly performed, it is though that work efficiency can be improved.

Here, the pendant 4 switches between the action mode in which the inching operation is performed in a two-dimensional direction within the action plane shown in (A) of FIG. 8 and the action mode in which the inching operation is performed in the height direction (such as the ZF axis direction) shown in (B) of FIG. 8, based on whether or not the user is touching the switch button S. In (B) of FIG. 8, boundary lines (Lz) are set to set the number of actions of the inching operation in the ZF axis direction.

As a result, the axis on which the robot 2 is operated can be changed simply by the switch button S being touched. Furthermore, switching can be performed between the inching operation on the action plane and the inching operation in the height direction appropriate for the teaching operation. Work efficiency can be improved. In addition, in the case in (A) and (B) of FIG. 9, the pendant 4 changes the action mode of the inching operation in relation to a single operation-input mode, by the switch button S. Specifically, the pendant 4 changes the action direction of the inching operation associated with an operation is made in a lateral direction in the touch operation.

When operating the touch panel 22, it is difficult for the user to ascertain the operating position by guesswork, because the surface is flat. However, it is thought that, as the user becomes more experienced in operating the touch panel 22, the user can become more proficient in sensing the amount by which to move the finger to increase the number of actions of the inching operation (for example, to cross the boundary line (Lx) in (A) of FIG. 9). In this case, the user becoming proficient in sensing the operating amount in both the vertical and lateral directions of the screen can, of course, be considered. However, it is also thought that, if a configuration is used in which the direction itself in which the finger is moved is not changed, the degree of proficiency, that is, the accuracy of the touch operation will increase.

Figure 9:
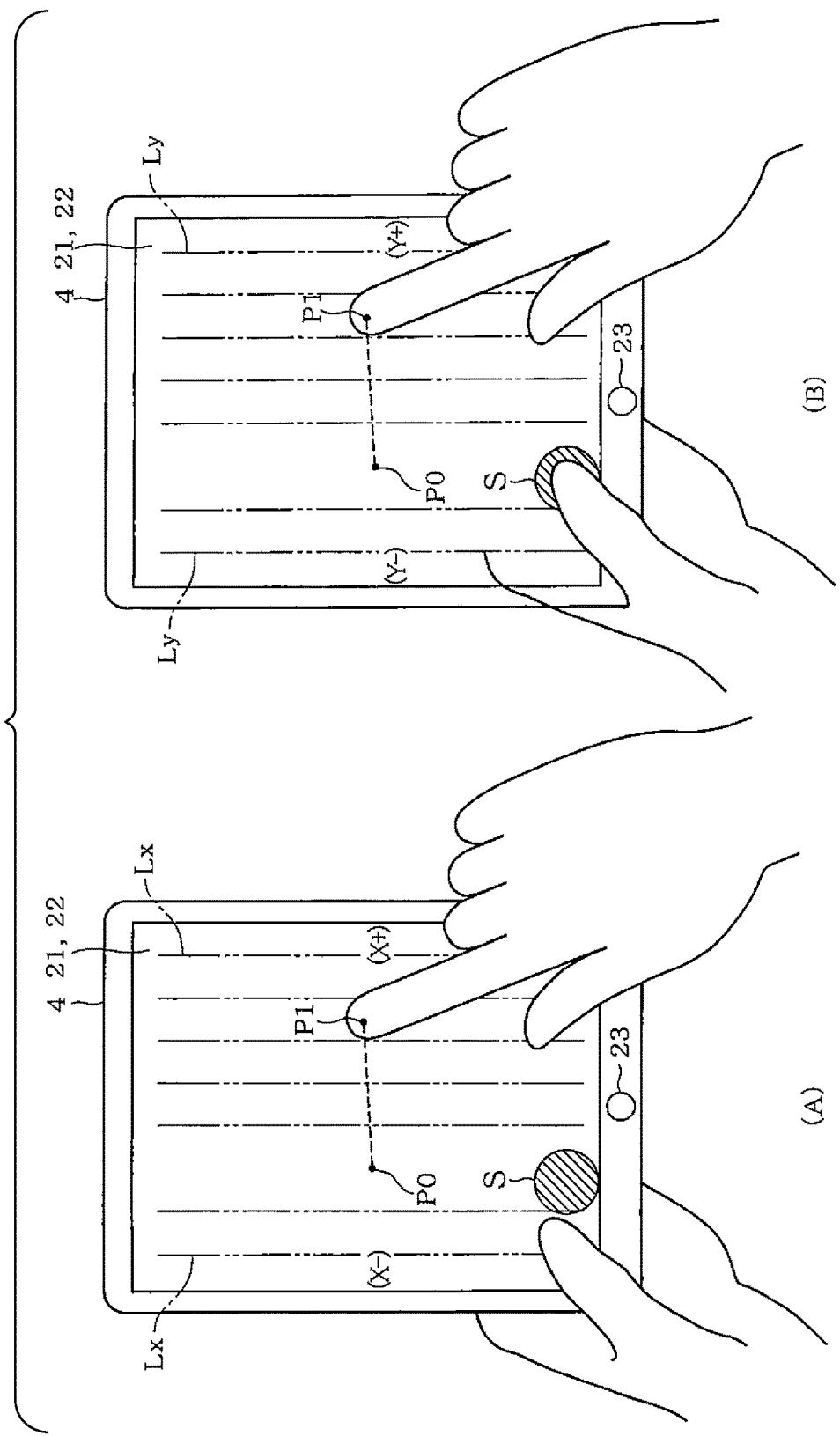
FIG. 9, in (A) and (B) thereof, show third diagrams schematically showing a method for changing the correspondence between the operation-input mode of a touch operation and the action mode of a robot.

Here, the pendant 4 switches between the action mode in which, for example, the inching operation is performed on the XF axis in relation to the operation-input mode in the lateral direction of the screen, as shown in (A) of FIG. 9, and the action mode in which, for example, the inching operation is performed on the YF axis in relation to the operation-input mode in the lateral direction of the screen, as shown in (B) of FIG. 9, based on whether or not the user is touching the switch button B. As a result, the user can change the axis on which the robot 2 performs the inching operation by moving the finger in the same direction (such as the lateral direction of the screen in (A) of FIG. 9) at all times, when inputting a touch operation. Should the user become proficient with this operation, the user can make the robot 2 perform a desired inching operation without looking at the pendant 4.

In this case, if importance is placed on responsiveness, the inching operation amounting to the number of fingers touching the touch panel 22 (the number of input positions) can be made the instant the fingers touch the touch panel 22. When new fingers touches the touch panel 22 while a plurality of fingers are already touching the touch panel 22, the number of actions can then be set based on this number of fingers. The robot 2 can be made to quickly perform the inching operation by the number of actions intended by the user.

Meanwhile, if importance is placed on safety, the inching operation may be performed after a predetermined wait period elapses after fingers corresponding to the desired number of actions touches the touch panel 22. As a result of the wait period being set, the user can be given leeway to cancel the inching operation. In this case, when the number of fingers (the number of input positions) that are touching the touch panel 22 during the wait period increases, it is preferable that the wait period is reset when the last finger touches the touch panel 22. As a result, an erroneous operation that makes the robot 2 perform an unintended inching operation, resulting from the screen being erroneously touched, can be prevented. The inching operation may be canceled when a finger moves or the number of finger decreases during the wait period.

<<Setting Operation Target>>

Figure 10:
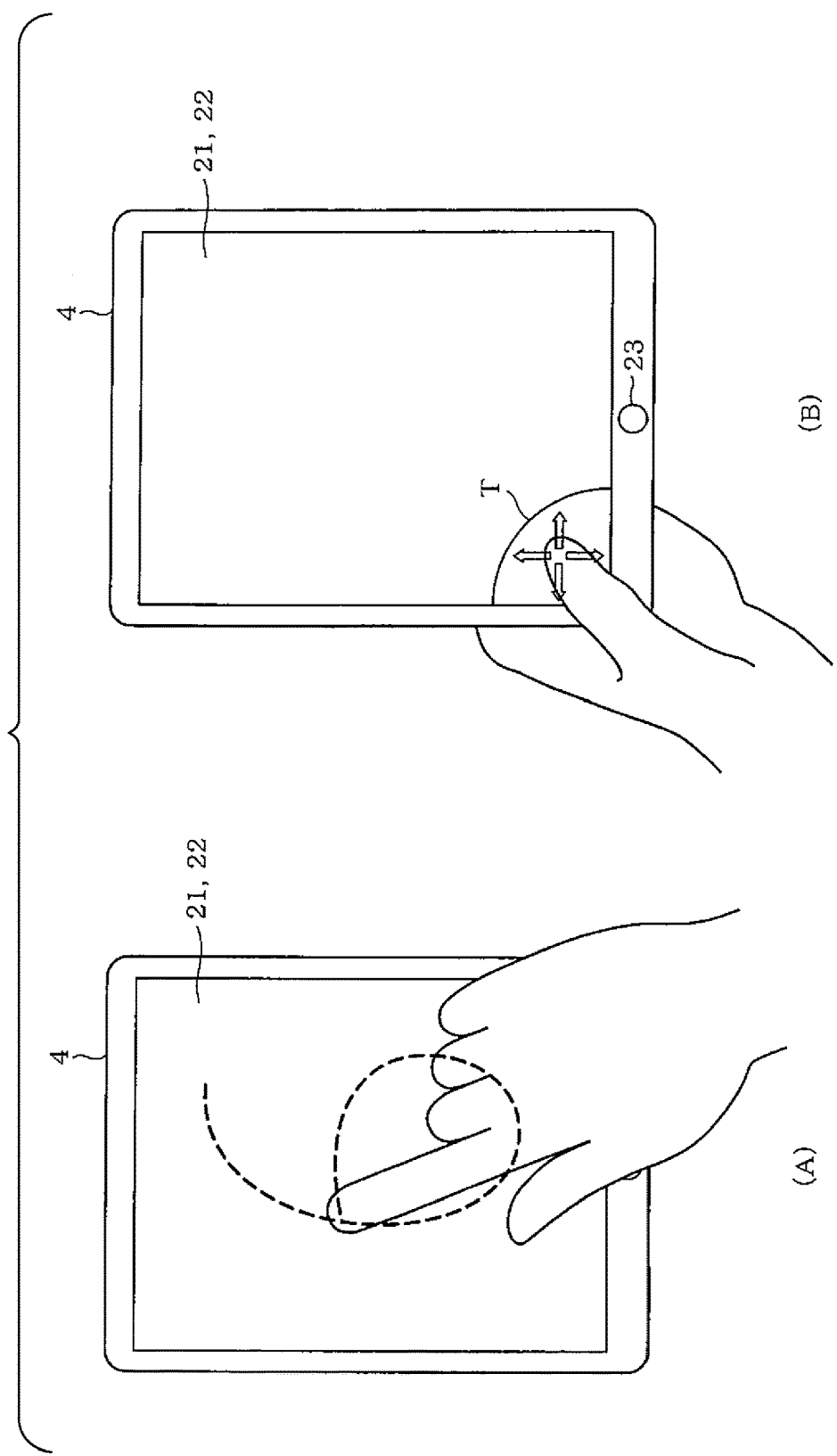
FIG. 10, in (A) and (B) thereof, show diagrams diagram schematically showing an example of an operation-input mode for selecting an axis to be operated.

Next, a method for setting an axis to be the target of an inching operation will be described. The method described below is an example. The present invention is not limited thereto. For example, as shown in (A) of FIG. 10, the user can set the axis to the target of the inching operation by inputting a number or a symbol indicating the target axis (the J6 axis (flange axis) in (A) of FIG. 10) to the touch panel 22. In addition, as shown in (B) of FIG. 10, the user can set the axis to be the target of the inching operation by operating a selection area T, or selecting a button (not shown) that directly designates the target axis or the like.

In the pendant 4 that serves as the robot operating apparatus, described above, the following effects can be achieved. The pendant 4 that serves as the robot operating apparatus includes the operation-input mode detecting unit 26, the action setting unit 28, and the action command generating unit 30. The operation-input mode detecting unit 26 detects the operation-input mode of a touch operation inputted to the touch panel 22. The action setting unit 28 sets the action direction and the number of actions of an inching operation by the robot 2, based on the action mode associated with the operation-input mode with a certain amount of margin. The action command generating unit 30 generates an action command for operating the robot 2 to perform the inching operation in the action direction and by the number of actions that are set.

As a result, the action mode of the inching operation can be set by the operation-input mode of the touch operation. In addition, the action direction and the number of actions can be set by a single touch operation. Therefore, operability is improved, and teaching time can be shortened. As a result, work efficiency can be improved. Furthermore, it is thought that performing input of a precise length is difficult when a finger is traced over the touch panel 22. However, as a result of the number of operations being set in steps, that is, the movement distance of the finger being divided into predetermined ranges and associated with the number of actions, the risk of the intended number of actions not being set and the robot 2 operating by more than the intended number of actions can be reduced.

The pendant 4 detects the operating direction and the operating amount as the operation-input mode. The operating direction indicates the direction in which the operating position changes. The operating amount indicates the amount by with the operating position changes. The action direction of the inching operation is set based on the operating direction. The number of actions of the inching operation is set in steps based on the operating amount. An operation in a two-dimensional direction can be inputted to the touch panel 22. Therefore, the action direction and the number of actions can be set by a single touch operation by the operating direction being associated with the action direction and the operating amount (movement distance of the finger) being associated with the number of actions. Operability can be improved. In addition, because the axes on which the operation is performed are fixed, the inching operation is not performed in an unintended direction, even should the user be unable to draw a straight trajectory during the touch operation.

The pendant 4 detects the operating direction and the operating amount as the operation-input mode. The operating direction indicates the direction in which the operating position changes. The operating amount indicates the amount by with the operating position changes. The pendant 4 associates differing action directions within the panel surface of the touch panel 22. The pendant 4 sets the action direction of the inching operation to a one-dimensional direction or a two-dimensional direction based on the operating direction. In addition, the pendant 4 decomposes the operating amount into components for each action direction, and sets the number of actions of the inching operation based on the component for each action direction. As a result, settings for a two-dimensional direction (two directions) can be made at the same time by a single touch operation. Operability is further improved. In addition, the teaching operation can be efficiently performed if an operation in a two-dimensional direction is possible. Therefore, work efficiency can be significantly improved.

The pendant 4 includes the determination area setting unit 31 that sets the determination area (R) on the panel surface of the touch panel 22. The size of the determination area (R) is set in advance. At the start of a touch operation, the pendant 4 sets the determination area with the start position as the center. Then, each time the operating position reaches an edge (or the boundary) of the determination area, the pendant 4 newly sets the determination area with the arrival position, which is the position reached by the operating position, as the center. At this time, the pendant 4 detects the direction from the center of the determination area to the arrival position as the operating direction, and detects the number of times the operating position reaches an arrival point as the operating amount. In addition, when the operating position reaches an edge of the determination area, the pendant 4 sets the new determination area with the arrival position as the center. The pendant 4 sets the action direction of the inching operation to a one-dimensional direction or a two-dimensional direction, based on the operating direction. The pendant 4 also sets the number of actions of the inching operation in steps, based on the operating amount.

As a result, settings for a two-dimensional direction (two directions) can be made at the same time by a single touch operation. Operability is further improved. In addition, the teaching operation can be efficiently performed if an operation in a two-dimensional direction is possible. Therefore, work efficiency can be significantly improved. Furthermore, the new determination area is set each time the operating position reaches an edge (or the boundary) of the determination area. Therefore, the action direction can be set again each time. Even when the robot 2 overshoots the target position, the user can promptly make the robot 2 perform the inching operation in the reverse direction. Usability is further improved.

The pendant 4 detects the number of operating positions at which the touch operation is inputted (the number of input positions touched by the user) as the operation-input mode. The pendant 4 sets the number of actions of the inching operation to a number proportional to the number of input positions. The inching operation moves the robot 2 over a miniscule distance. Therefore, the inching operation may be repeatedly performed a plurality of times after the robot 2 is roughly positioned. In this case, when a single inching operation is performed by a single touch operation, although this operation is suitable for fine adjustment, the inching operation is required to be performed numerous times to move the robot 2 over a relatively long distance.

Therefore, as a result of the number of actions being set in proportion to the number of input positions, the number of actions in relation to a single touch operation can be increased. In other words, the robot 2 can be moved over a relatively long distance by a smaller number of touch operations. Therefore, the amount of time required for the teaching operation can be shortened.

The pendant 4 includes the switching unit 9 that changes the correspondence between the operation-input mode and the action mode associated by the associating unit 27. During the teaching operation, there are cases, of course, in which the robot 2 is to be operated on only a single axis. However, there are also cases in which the robot 2 is to be operated on two axis at the same time. In such cases, it is thought that if the subject axis can be quickly changed, work efficiency of the teaching operation can be improved. Here, as a result of the action mode associated with the operation-input mode of the touch operation being changed as in (A) and (B) of FIG. 7 to (A) and (B) of FIG. 9, described above, and the action mode to which the change is made being appropriate for the teaching operation, work efficiency of the teaching operation can be improved.

The pendant 4 presents the boundary positions (boundary lines or determination area) that serve as boundaries for changing the number of actions such as to be visible to the user. It is thought that a user who is inexperienced in operating the pendant 4 cannot ascertain, by sensing, the amount by which to move the finger to increase the number of actions. Therefore, as a result of the boundary lines or the determination area being visibly displayed, even an inexperienced user can easily set the action direction and the number of actions of the inching operation.

The pendant 4 sets the boundary positions that serve as the boundaries for changing the number of actions at even intervals with the start position (P0) as the starting point. The start position (P0) is the operating position at which the touch operation is first inputted. As a result, the number of actions of the inching operation is the same when the operating amount is the same. A user experienced in touch operation can set, by sensing, the number actions. Work efficiency of the teaching operation can be improved.

In addition, as a result of the boundary positions being set at even intervals, a gap is formed between adjacent boundary positions, that is, an area in which the number of actions does not change is formed. Therefore, even when the operating amounts are not precisely the same, or in other words, as long as the operating amounts are substantially the same, the same number of actions can be set. Consequently, usability can be improved for users inexperienced in touch operation, as well as users experienced in touch operation.

In the pendant 4, a robot operating method is used in which the operation-input mode of a touch operation on the touch panel 22 is associated with the action mode of an inching operation of the robot 2. The operation-input mode of a touch operation inputted to the touch panel 22 is detected. Based on the action mode associated with the operation-input mode, the action direction and the number of actions of the inching operation by the robot 2 are set. An operation command for operating the robot 2 such as to perform the inching operation in the action direction and by the number of actions that are set is generated. As a result of this method being used, effects similar to those of the above-described robot operating apparatus, that is, improvement in operability, shortening of teaching time, improvement in work efficiency, and the like can be achieved in a configuration including the touch panel 22.

(Other Embodiments)

The present invention is not limited to the embodiment described above and shown in the drawings. The present invention can be applied to various embodiments without departing from the spirit of the invention. For example, the present invention can be modified or expanded in the following manner. The boundary lines (Lx and Ly) and the determination area (R) described according to the embodiment may be presented such as to be visible to the user by being displayed in the display unit 21. In addition, when the operating position crosses the boundary line or reaches the edge of the determination area, the user may be given notification thereof by the notifying unit 25 by sound or the like.

According to the embodiment, the boundary lines (Lx and Ly) that indicate the boundary positions are set at even intervals. However, the boundary lines may be set at differing intervals. For example, when the operating amount of the touch operation is large, it can be inferred that the user wishes to move the robot 2 by a significant amount. Therefore, the intervals between the boundary lines may be set to be relatively wide near the start position to enable fine adjustment. The intervals between boundary lines may then become relatively narrow as the boundary lines become farther away from the start position. The number of actions when the finger is moved by a large amount may be changed in this way.

Figure 11:
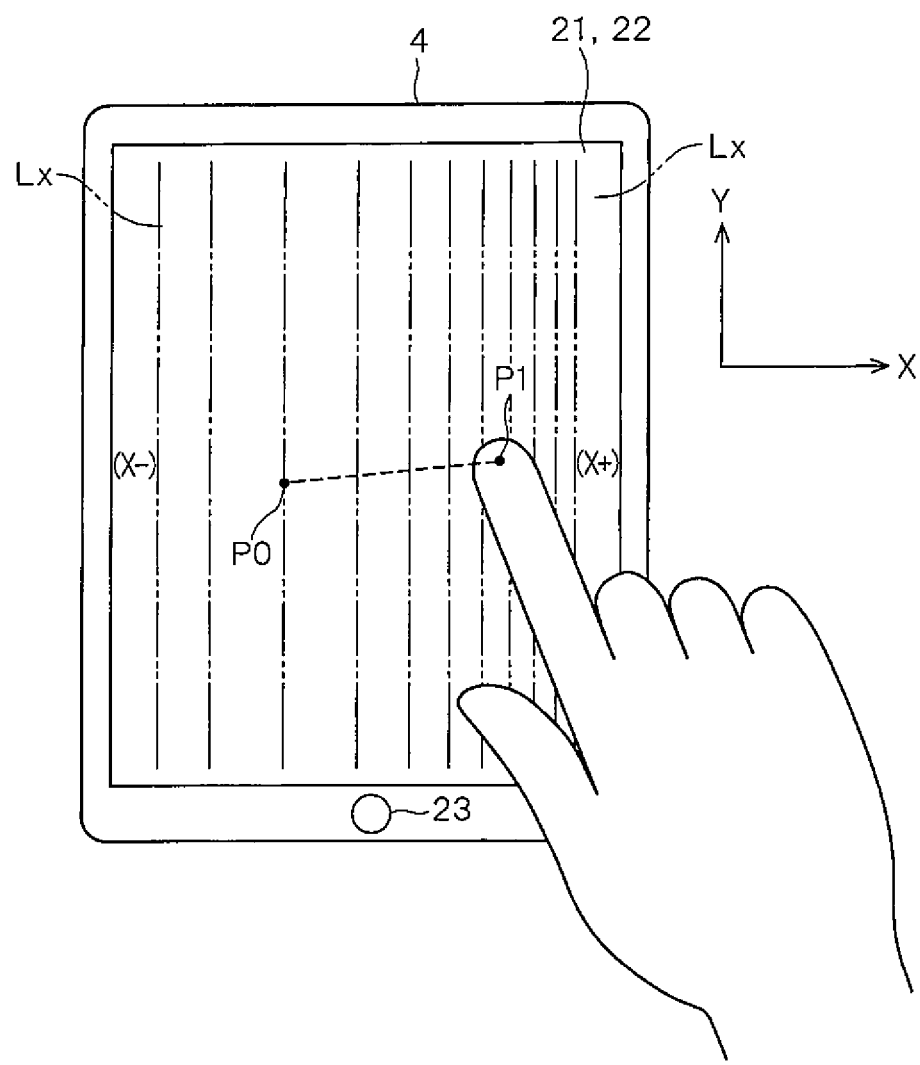
FIG. 11 is a first diagram of an example of a boundary position setting according to another embodiment.

Specifically, as shown in FIG. 11, with the start position (P0) as the starting point, the boundary lines (Lx) set away from the start position (P0) towards the right side in FIG. 11 may have narrower intervals than the boundary lines (Lx) set near the start position (P0). As a result, the robot 2 can be made to perform a larger number of inching operations by a touch operation within the limited space of the panel surface of the touch panel 22. The end effector position can be moved by a relatively large amount without the operation being switched to continuous operation. In addition, because the intervals between the boundary lines are relatively wide near the start position (P0), the robot 2 can be prevented from erroneously performing the inching operation a plurality of times where only one or two inching operations are intended. In other words, movement of the end effector position by a relatively large amount and movement of the end effector position over a miniscule distance can both be achieved.

Figure 12:
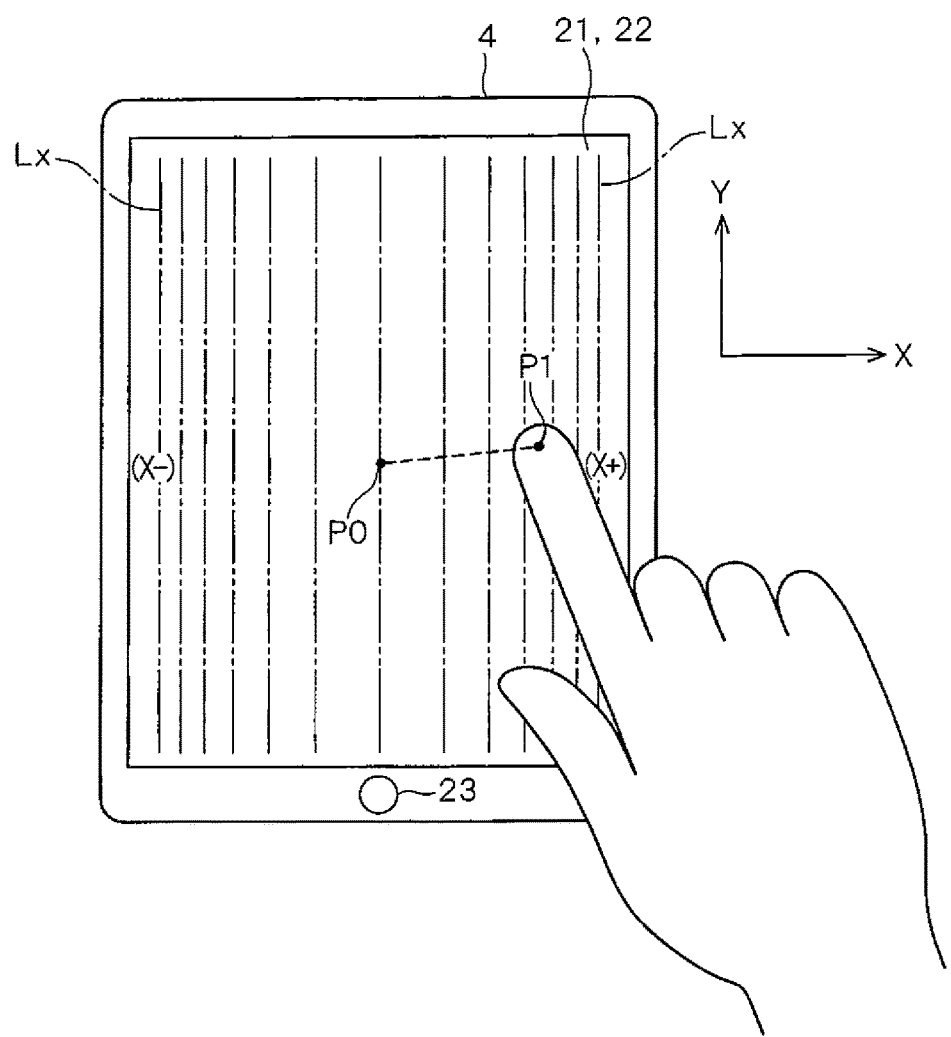
FIG. 12 is a second diagram of an example of a boundary position setting according to another embodiment.
Figure 13:
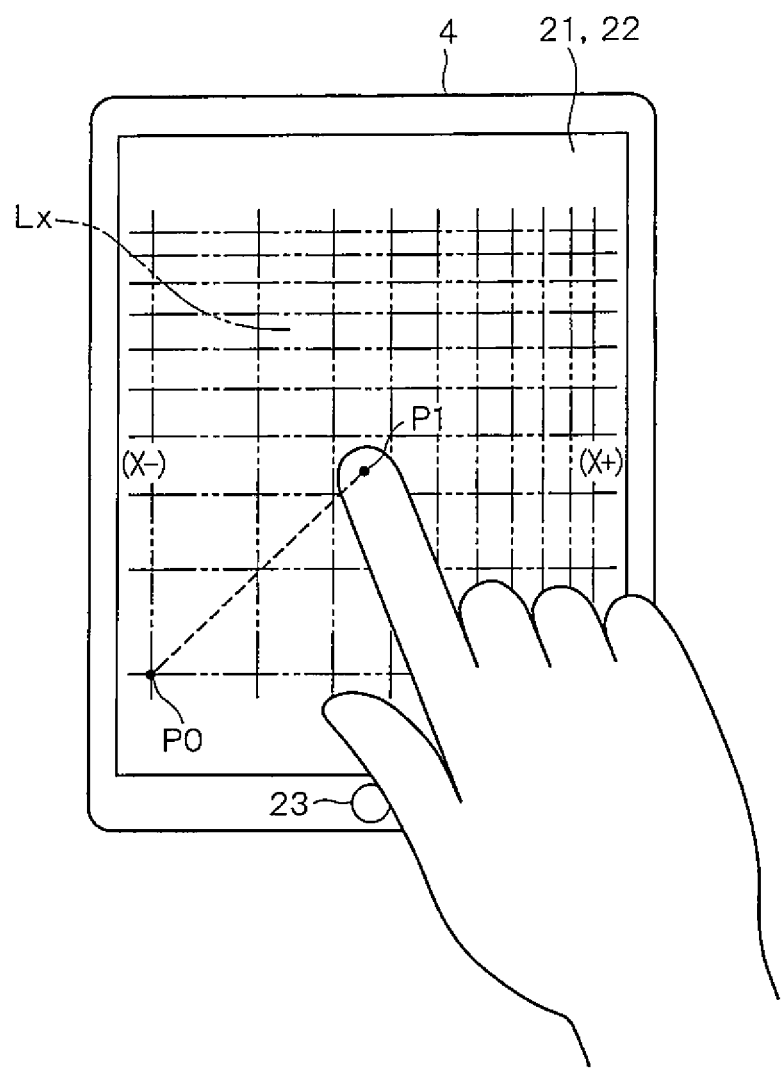
FIG. 13 is a third diagram of an example of a boundary position setting according to another embodiment.

In this case, as shown in FIG. 12, the intervals between the boundary lines may be set such as to be uneven in both the positive direction and the negative direction in relation to the start position (P0). That is, the boundary lines may be set to be symmetrical with the start position (P0) at the center. In addition, as shown in FIG. 13, when association with an operation of the robot 2 in a two-dimensional direction is made on the panel surface of the touch panel 22, the intervals of the respective boundary lines in the vertical direction and the lateral direction in FIG. 13 may be set such as to be uneven. Of course, the intervals of only the boundary lines in either of the vertical direction and the lateral direction may be set such as to be uneven.

Figure 14:
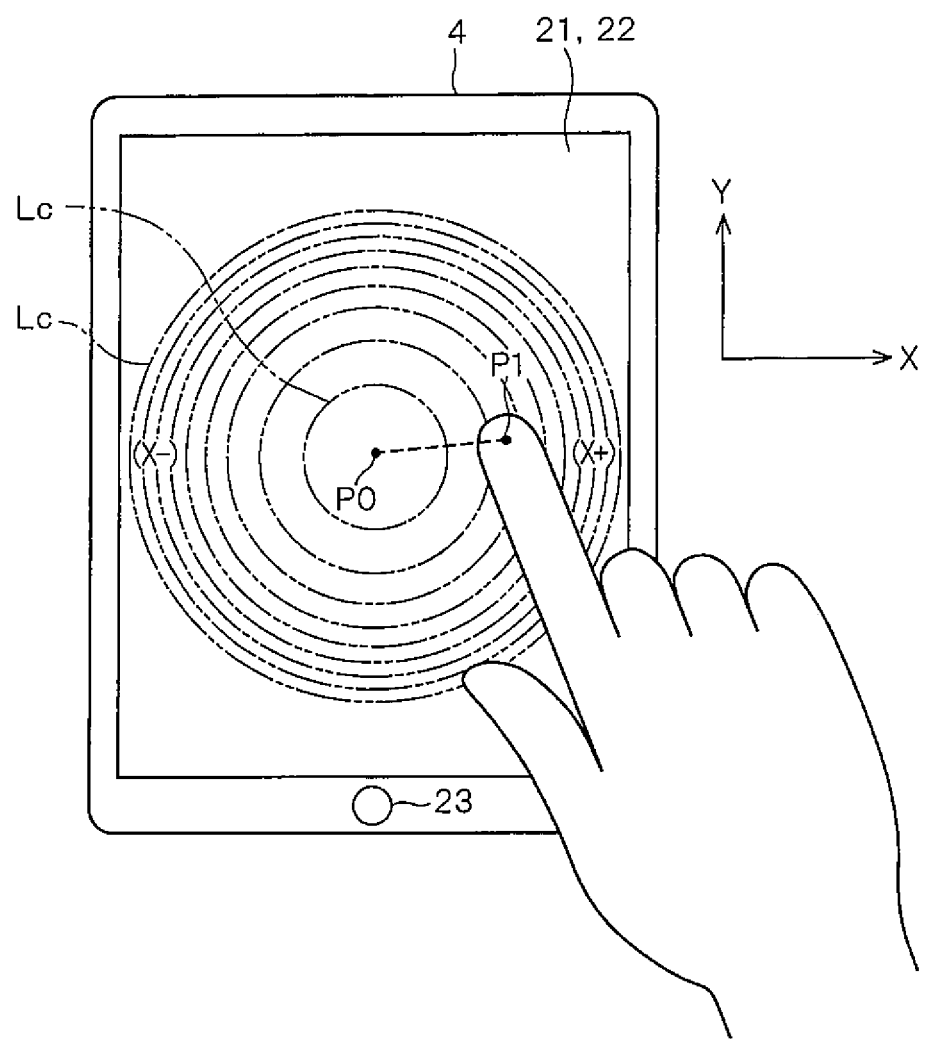
FIG. 14 is a fourth diagram of an example of a boundary position setting according to another embodiment.

Furthermore, as shown in FIG. 14, when association with an operation of the robot 2 in a two-dimensional direction is made on the panel surface of the touch panel 22, boundary lines (Lc) that have concentric circular shapes with the start position (P0) as the center may be set. The intervals between the boundary lines (Lc) may be set such as to be uneven based on the distance from the start position (P0). In FIG. 14, the intervals between the boundary lines (Lc) are set to become narrower as the boundary lines (Lc) become farther away from the start position (P0). The boundary lines (Lc) may also be set at even intervals.

Figure 15:
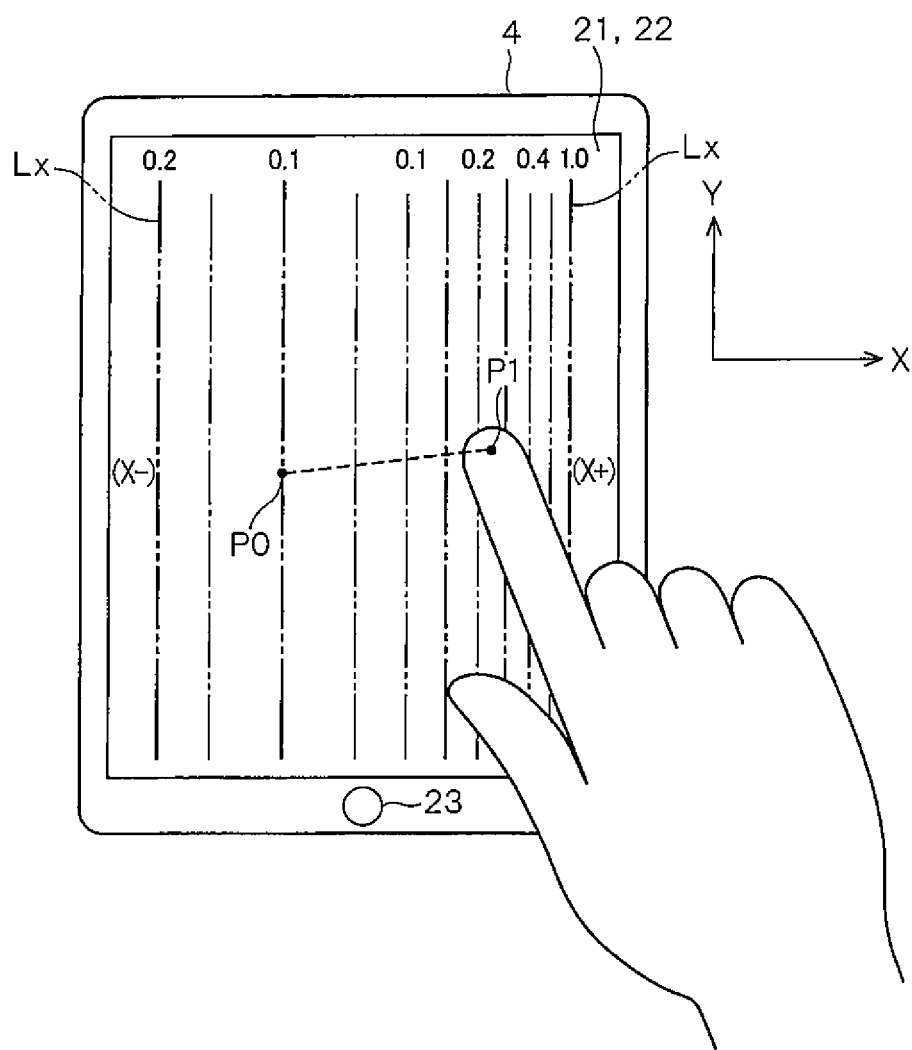
FIG. 15 is a fifth diagram of an example of a boundary position setting according to another embodiment.

Moreover, as shown in FIG. 15, boundary lines that serve as boundaries for changing the number of actions may be set with the start position (P0) as the starting point. In addition, the number of actions in relation to a single boundary line or an action amount of a single inching operation may be set to increase as the boundary line becomes farther away from the start position (P0). In FIG. 15, an example of the action amount is shown. That is, the boundary line indicated by a thick line adjacent to the start position (P0) indicates that the inching operation is performed in units of 0.1 mm. The boundary lines indicated by other thick lines respectively indicate that the inching operation is performed in units of 0.2 mm, units of 0.4 mm, and units of 1.0 mm.

The numeric values and amounts of increase shown in FIG. 15 are examples. The present invention is not limited thereto. For example, other numeric values, such as units of 0.01 mm, may be used. In addition, the number of actions, rather than the action amount, may be increased. In this way, as a result of the number of actions or the action amount of the inching operation in relation to the operating amount of the touch operation being increased as the boundary line becomes farther away from the start position, the robot 2 can be made to perform a larger number of inching operations by a touch operation within the limited space of the touch panel 22.

Figure 16:
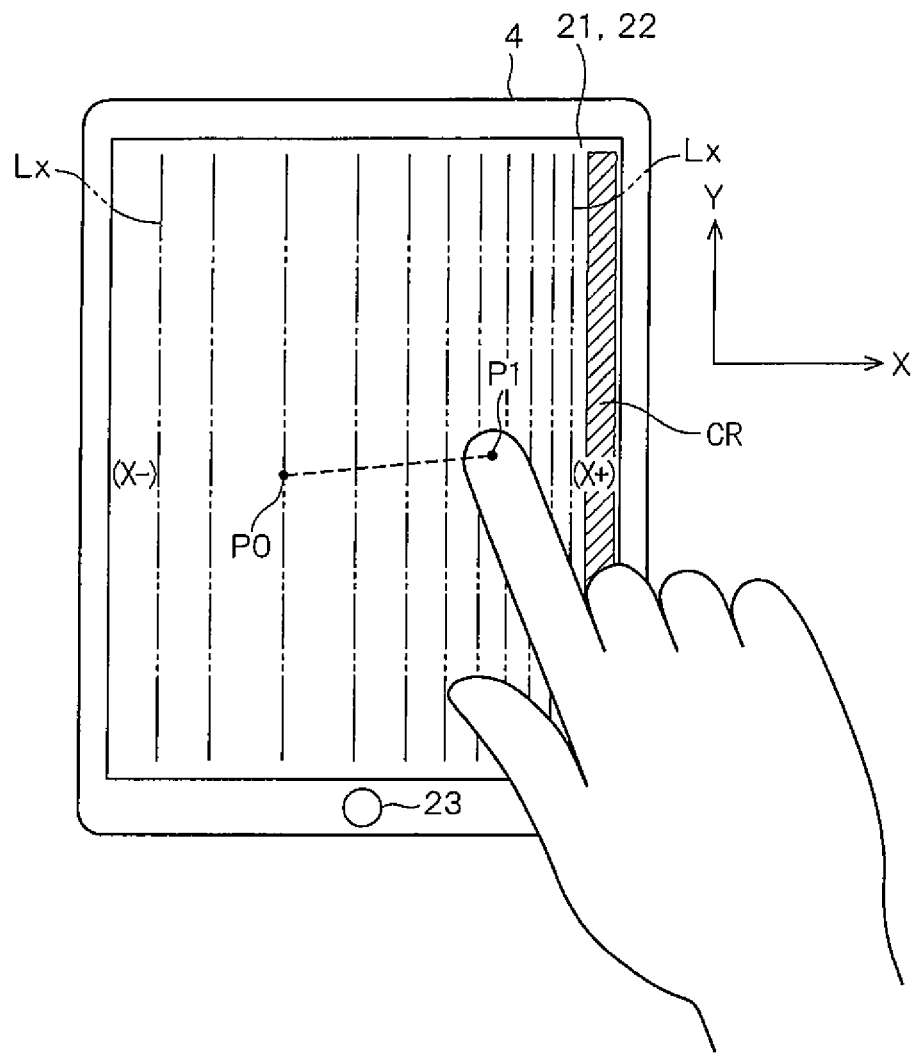
FIG. 16 is an example of a continuous operation area setting according to another embodiment.

Furthermore, as shown in FIG. 16, a continuous operation area (CR) for commanding that the inching operation be repeatedly performed may be set. While the touch operation is being inputted to the continuous operation area, the inching operation may be repeatedly performed at an action interval prescribed in advance or each time the operating position within the continuous operation area changes. In this case, for example, the action interval can be set to a predetermined number of control cycles or to a predetermined period, such as 0.1 seconds. In addition, the change in the operating position can be detected by a finger moving. However, the determination that the operation position has changed may be made by a gravitational-center position changing while the finger is touching the touch panel 22. In other words, the inching operation may be repeatedly performed when a finger is moved in a rubbing manner at a certain position. As a result, the robot 2 can be made to perform the inching operation an arbitrary number of times, without the touch operation being repeatedly inputted. In other words, the end effector position of the robot 2 can be moved over an arbitrary distance without the bothersome operation of removing the finger, moving the finger to a new start position, and inputting the touch operation again.

In this case, the continuous operation area (CR) may be set in the direction in which the operating direction changes, with the start position (P0) as the starting point. The size of the touch panel 22 is limited. Therefore, when the continuous operation area (CR) is set in advance, the area over which the boundary lines can be set become small. As a result, the number of actions that can be designated by the touch operation may decrease and a reduction in operability may occur. In this case, because the inching operation is performed during the manual operation by the user, the direction in which the inching operation is performed and the number of times the inching operation is performed is unclear until the actual touch operation is inputted. That is, it is difficult to predict in advance the location to set the continuous operation area such that input of the touch operation is not obstructed.

Here, the continuous operation area (CR) is set in the direction in which the operating position changes with the start position (P0) as the starting point, that is, the rightward direction in FIG. 16. As a result, because the continuous operation area (CR) is not set at the time of input of the touch operation, the area over which the boundary lines can be set does not become small. After the direction in which the operating position changes is specified, the continuous operation area (CR) is set, for example, in the end portion in the rightward direction of the touch panel 22 in FIG. 16. As a result, it can be inferred that the user wishes to further perform the inching operation if a touch operation from the start position (P0) to the continuous operation area (CR) is inputted.

Therefore, as a result of the continuous operation area (CR) being set on the end portion side of the touch panel 22 in the direction in which the operating position changes, it is thought that the intent of the user can be read and usability can be improved. The continuous operation area (CR) may be applied to the boundary lines of according to the embodiment, and the aspects shown in FIG. 12 to FIG. 15 and the like. For example, in the aspect shown in FIG. 12, the continuous operation area (CR) may be set at each end in both directions of the touch panel 22, that is, the left and right sides in FIG. 12. Alternatively, in the aspect shown in FIG. 13, the continuous operation area (CR) may be set in each end portion in the four directions of the touch panel 22, that is, the upper, lower, left, and right sides in FIG. 13. In addition, in the aspect shown in FIG. 14, a circular continuous operation area (CR) may be set on the outer side of the boundary line (Lc) on the outermost edge. Furthermore, the boundary lines may be displayed such as to be visible to the user or not displayed.

According to the embodiment, an example is given in which the inching operation is performed when a touch operation in which the operating position crosses a boundary position, such as a boundary line, from the start position (P0) is inputted. However, a single inching operation may be performed even when the touch input inputted by the user is such that the operating position does not cross the boundary position nearest to the start position (P0). A reason for this is that it is presumed that, in cases in which the robot 2 is to be made to perform a single inching operation at the final stage of the fine adjustment of the end effector position, the user will input the touch operation by a so-called flick operation. As a result, because the finger is not required to be moved until the boundary position nearest to the start position (P0) is crossed, the inching operation can be performed in a shorter amount of time. It is thought that usability will be improved. In this case, the action direction of the robot 2 may be specified by the direction of the flick operation.

In the first example of the one-dimensional operation, the first example of the two-dimensional operation, and the second example of the two-dimensional operation according to the embodiment, an example is given in which the touch operation is performed with a single finger. However, the touch operation may be performed with a plurality of fingers as in the second example of the one-dimensional operation. The number of actions may be set based on the number of fingers. In this case, when the touch operation is performed with a plurality of fingers, the first finger to touch the touch panel 22 may be detected. The touch operation may be considered to be performed with the plurality of fingers while the first finger to touch the touch panel 22 is still touching the touch panel 22. No further inching operations may be performed once the first finger to touch the touch panel 22 is removed. In addition, when the number of fingers changes after the start of the inching operation, the number of actions may be set based on the number of fingers to which the change is made.

At this time, it is thought that moving the plurality of fingers in exactly the same manner is difficult. Therefore, based on the operating direction and the operating amount of the first finger to touch the touch panel 22, the operating amount (that is, the number of actions of the inching operation) may be increased in proportion to the number of fingers touching the touch panel 22. The subject to be operated by the robot operating apparatus is not limited to the six-axis, vertical, articulated-type robot given as an example according to the embodiment. The robot operating apparatus may operate a four-axis, horizontal, articulated-type robot. That is, the present invention can be applied to various robots prescribed by Japanese Industrial Standards (JIS). In terms of shape classification, the robots include vertical articulated-type robots, horizontal articulated-type robots, Cartesian coordinate robots, and parallel link robots.

The associations between the coordinate systems and axes, as well as the associations between the operations inputted to the pendant 4 and corresponding processes, actions, and the like, that are given as examples according to the embodiment are examples. The present invention is not limited thereto. The robot operating apparatus according to the embodiment is configured by the robot-dedicated pendant 4. However, the robot operating apparatus is not limited thereto. An application for robot control may be loaded onto a general-purpose, tablet-type terminal (a so-called tablet personal computer [PC]), a smartphone (a multifunctional mobile phone), or the like, thereby configuring the robot operating apparatus. In such configurations as well, functions identical to those of the above-described pendant 4 can be actualized. Similar effects can be achieved.

According to the embodiment, an example is given in which the robot operating apparatus is configured by the pendant 4 alone. However, the action command generating unit 30 may be provided on the controller 3 side. The pendant 4 may be used as an operating terminal. The operation-input mode when a touch operation is inputted may be transmitted to the controller 3. The controller 3 may then generate the action command. That is, the robot operation apparatus may be configured by the controller 3 and the pendant 4. The contrast between the pendant 4 and the hand shown in the drawings is an example, and does not limit the size and shape of the pendant 4. In addition, the upper, lower, left, and right sides of the pendant 4 can be arbitrarily defined regardless of the vertical and lateral orientations of the screen.

What is claimed is:

1. An apparatus for operating a robot, the apparatus comprising:
    a touch panel to which a user's manual touch operation is inputted by moving a finger of the user on or along the touch panel;
    an operation-input mode detecting unit that detects an operation-input mode of the touch operation inputted to the touch panel;
    an action setting unit that sets an action direction and the number of actions of an inching operation by a robot, based on an action mode of the robot associated with the operation-input mode, the operation-input mode being given a predetermined amount of margin, the user's manual touch operation being admitted when the user's manual touch operation is within the predetermined amount of margin; and an action command generating unit that generates an action command for operating the robot such that the inching operation is performed in the action direction and by the number of actions set by the action setting unit.

2. The apparatus according to claim 1, wherein the touch panel is configured to receive the user's manual touch operation including at least one of a user's finger moving operation on the touch panel and a user's manual moving operation of a tool held by the user, the tool being moved on the touch panel by moving the finger along the touch panel.

3. The apparatus according to claim 2, wherein:
the touch panel is provided with a panel surface on which a one-dimensional direction is associated;
the operation-input mode detecting unit detects, as the operation-input mode, a user's manual operating direction indicating a direction in which an operating position on the touch panel changes and a user's manual operating amount indicating an amount by which the operating position changes; and
the action setting unit sets the action direction in a one-dimensional direction of the inching operation based on the operating direction, and sets the number of actions of the inching operation in steps based on the operating amount.

4. The apparatus according to claim 3, wherein:
the operation-input mode detecting unit detects, as the operation-input mode, the number of input positions at each of which the user's manual touch operation is inputted, and
the action setting unit provides the number of the inching operations with the number of times which are proportional to the number of the input positions.

5. The apparatus according to claim 4, comprising
a switching unit that switches a correspondence relationship between the operation-input mode for the touch operation and the action mode of the robot associated with the operation-input mode.

6. The apparatus according to claim 5, wherein
the action setting unit provides the user, in a visible manner to the user, with a boundary position of a boundary indicating a change of the number of the actions.

7. The apparatus according to claim 2, wherein:
the touch panel has a panel surface on which plural action directions are associated which are different from each other;
the operation-input mode detecting unit detects, as the operation-input mode, a user's manual operating direction and a user's manual operating amount, the operating directions indicating directions in which an operating position changes, the operating amount indicating an amount by which the operating position changes;
the action setting unit sets the action direction for the inching operation into any one of a one-dimensional direction and a two-dimensional direction based on the operating direction and decomposes the operating amount into components for each of the action directions so as to set the number of actions of the inching operation depending on the components for each of the action directions.

8. The apparatus according to claim 7, wherein:
the operation-input mode detecting unit detects, as the operation-input mode, the number of input positions at each of which the user's manual touch operation is inputted, and
the action setting unit provides the number of the inching operations with the number of times which are proportional to the number of the input positions.

9. The apparatus according to claim 8, comprising
a switching unit that switches a correspondence relationship between the operation-input mode for the touch operation and the action mode of the robot associated with the operation-input mode.

10. The apparatus according to claim 2, wherein:
the touch panel has a panel surface on which plural action directions are associated which are different from each other; and
the apparatus comprises a determination area setting unit that sets a determination area on the panel surface of the touch panel, the determination area having a preset size,
wherein the determination area setting unit i) sets the determination area centered on a start position when the touch operation is started, the start position being the operating position at which the user's manual touch operation is first inputted, and ii) sets newly the determination area centered on an arrival position to which the user's manual touch operation continues each time the operating position reaches an edge of the determination area,
the operation-input mode detecting unit i) detects, as the operating direction, a direction from a center of the previously set determination area to the arrival position, ii) detects, as the operating amount, the number of times of arriving at the arrival position, and iii) allows the determination area setting unit to newly set determination area each time the operating position reaches the edge of the determination area, the newly set determination area being centered on a position of the reached edge, and
the action setting unit that sets the action direction in the inching operation in either a one-dimensional direction or a two-dimensional direction, based on the operating direction, and sets the number of times of the inching operation in steps depending on the operating amount.

11. The apparatus according to claim 2, wherein:
the operation-input mode detecting unit detects, as the operation-input mode, the number of input positions at each of which the touch operation is inputted, and
the action setting unit provides the number of the inching operations with the number of times which are proportional to the number of the input positions.

12. The apparatus according to claim 11, comprising
a switching unit that switches a correspondence relationship between the operation-input mode for the touch operation and the action mode of the robot associated with the operation-input mode.

13. The apparatus according to claim 12, wherein
the action setting unit provides the user, in a visible manner to the user, with a boundary position of a boundary indicating a change of the number of the actions.

14. The apparatus according to claim 2, comprising
a switching unit that switches a correspondence relationship between the operation-input mode for the touch operation and the action mode of the robot associated with the operation-input mode.

15. The apparatus according to claim 2, wherein the action setting unit provides the user, in a visible manner to the user, with a boundary position of a boundary indicating a change of the number of the actions.

16. The apparatus according to claim 2, wherein the action setting unit sets the boundary position of a boundary indicating a change of the number of the actions, at equal intervals from a start position at which the first touch operation is inputted.

17. The apparatus according to claim 2, wherein the action setting unit sets the boundary position of a boundary indicating a change of the number of the actions, from a start position at which the first touch operation is inputted, such that an interval between the boundary positions becoming narrower as a distance from the start position becomes farther.

18. The apparatus according to claim 2, wherein the action setting unit sets the boundary position of a boundary indicating a change of the number of the actions, from a start position at which the first touch operation is inputted, such that either the number of the actions for the one boundary position or the operating amount in the one inching operation becomes larger as a distance from the start position becomes farther.

19. The apparatus according to claim 18, wherein the action setting unit sets the continuous operation area in a direction in which the operation position changes from a start position, the initial touch operation being inputted at the start position.

20. The apparatus according to claim 2, wherein the action setting unit sets a continuous operation area for commanding the repeated inching operation such that the inching operation is repeatedly performed every preset action interval or every change of the operation positions within the continuous operation area while the user's manual touch operation is being inputted to the continuous operation area.

21. A method of operating a robot, comprising:
associating an operation-input mode for a user's manual touch operation on a touch panel, with an action mode used in an inching operation of a robot, the user's manual touch operation being performed by moving a finger of the user on or along the touch panel, the inching operation being given a predetermined amount of margin the user's manual touch operation being admitted when the user's manual touch operation is within the predetermined amount of margin;
detecting the operation-input mode for the inching operation inputted on the touch panel;
setting an action direction and the number of actions of an inching operation by a robot based on the action mode of the robot associated with the operation-input mode; and
generating an action command for operating the robot such that the inching operation is performed in the action direction and by the number of actions.

* * * * *